(12) United States Patent
Saal et al.

(10) Patent No.: US 11,464,241 B2
(45) Date of Patent: *Oct. 11, 2022

(54) CHOCOLATE PROCESSING SYSTEM AND METHOD

(71) Applicant: CocoTerra Company, Palo Alto, CA (US)

(72) Inventors: Nathaniel Mark Saal, Palo Alto, CA (US); Knut Skarpaas, VIII, Palo Alto, CA (US)

(73) Assignee: CocoTerra Company, Palo Alto, CA (US)

( * ) Notice: Subject to any disclaimer, the term of this patent is extended or adjusted under 35 U.S.C. 154(b) by 358 days.

This patent is subject to a terminal disclaimer.

(21) Appl. No.: 16/533,630

(22) Filed: Aug. 6, 2019

(65) Prior Publication Data

US 2019/0357559 A1  Nov. 28, 2019

Related U.S. Application Data

(63) Continuation of application No. 14/997,983, filed on Jan. 18, 2016, now Pat. No. 10,463,057.

(Continued)

(51) Int. Cl.
*A23G 1/04* (2006.01)
*A23G 1/10* (2006.01)
(Continued)

(52) U.S. Cl.
CPC ............. *A23G 1/04* (2013.01); *A23G 1/10* (2013.01); *A23G 1/12* (2013.01); *A23G 1/18* (2013.01)

(58) Field of Classification Search
CPC ... A23G 1/04; A23G 1/10; A23G 1/12; A23G 1/18

(Continued)

(56) References Cited

U.S. PATENT DOCUMENTS 746,664 A * 12/1903 Bourdeau ........... B01F 7/00391
366/320
1,385,462 A * 7/1921 Marvin ................ A23G 3/2023
99/450.2

(Continued)

FOREIGN PATENT DOCUMENTS

CN  2731992 Y  10/2005
DE  661846 C  6/1938
(Continued)

OTHER PUBLICATIONS

Schumacher et al., "Development and evaluation of a laboratory scale conch for chocolate production", International Journal of Food Science and Technology, 2009, vol. 44, pp. 616-622.

(Continued)

*Primary Examiner* — Jimmy Chou
(74) *Attorney, Agent, or Firm* — Fenwick & West LLP

(57) ABSTRACT

A chocolate processing system, including: a chamber, defining a rotation axis, the chamber including a first and second portion cooperatively defining a chamber lumen, the first and second portion actuatably separable at a seam, and a precursor inlet; a precursor dispenser, including an actuatable compartment coupled to the precursor inlet of the chamber; a reducer, arranged within the chamber lumen; a rotationally actuatable processing shaft, intersecting the chamber lumen; an agitator coupled to the processing shaft and extending into the chamber lumen; a motor including a drive shaft, the drive shaft coupled to the processing shaft and the chamber; a temperature control system including a transfer surface, the transfer surface thermally connectable to the chamber; and a mold, defining a mold lumen, the mold circumferentially arranged about the chamber at a seam.

23 Claims, 18 Drawing Sheets

Related U.S. Application Data

(60) Provisional application No. 62/104,195, filed on Jan. 16, 2015.

(51) Int. Cl.
    *A23G 1/18* (2006.01)
    *A23G 1/12* (2006.01)

(58) Field of Classification Search
    USPC .......................................................... 99/453
    See application file for complete search history.

(56) References Cited

U.S. PATENT DOCUMENTS

| | | | |
|---|---|---|---|
| 2,081,888 A | 5/1937 | Birdsall | |
| 2,208,239 A | 7/1940 | Andersen | |
| 2,218,234 A | 10/1940 | Fisher | |
| 2,229,168 A | 1/1941 | Carroll | |
| 2,238,971 A | 4/1941 | Carroll | |
| 2,533,875 A * | 12/1950 | Cavalieri | B01F 7/166 241/66 |
| 2,558,128 A * | 6/1951 | Edwards | A23G 1/10 426/660 |
| 2,711,964 A * | 6/1955 | Weimer | A23G 1/042 99/494 |
| 2,784,095 A * | 3/1957 | Meagher | A23G 3/22 366/99 |
| 2,786,502 A | 3/1957 | Turner | |
| 2,915,024 A | 12/1959 | Otto | |
| 2,982,655 A | 5/1961 | Budd | |
| 3,115,821 A | 12/1963 | Hubner | |
| 3,167,035 A | 1/1965 | Benson | |
| 3,253,344 A * | 5/1966 | Van Gelder | F26B 23/04 34/289 |
| 3,263,592 A | 8/1966 | Hickey | |
| 3,323,320 A * | 6/1967 | Conz | A23G 9/16 62/303 |
| 3,388,046 A | 6/1968 | Hendrix | |
| 3,537,386 A * | 11/1970 | Grosbard | A23G 3/2015 99/353 |
| 3,607,313 A | 9/1971 | Roth | |
| 3,610,133 A * | 10/1971 | Mies, Jr. et al. | A47J 27/0817 99/337 |
| 3,634,106 A * | 1/1972 | Organ | A23G 1/10 99/485 |
| 3,648,904 A * | 3/1972 | Teige | A47J 31/41 222/380 |
| 3,649,290 A * | 3/1972 | Angold | A47J 27/0817 426/296 |
| RE27,405 E * | 6/1972 | Ehe et al. | B65B 5/12 53/155 |
| 3,690,247 A | 9/1972 | Van Cleven et al. | |
| 3,722,401 A | 3/1973 | Davidson et al. | |
| 3,739,711 A * | 6/1973 | Nieblach | A23G 3/04 99/348 |
| 3,808,511 A | 4/1974 | Schwarz | |
| 3,858,546 A | 1/1975 | Benson et al. | |
| 3,946,658 A | 3/1976 | Smith | |
| 3,952,538 A * | 4/1976 | Warlick | A23G 9/106 62/342 |
| 4,132,162 A | 1/1979 | Magnuson | |
| 4,175,690 A | 11/1979 | Bova et al. | |
| 4,283,012 A | 8/1981 | Hanson | |
| 4,293,570 A | 10/1981 | Vadasz | |
| 4,301,719 A | 11/1981 | Gerow | |
| 4,332,643 A | 6/1982 | Reid | |
| 4,357,111 A * | 11/1982 | Honemeyer | B01F 7/16 241/282.1 |
| 4,538,509 A * | 9/1985 | Ojima | A21B 1/40 366/144 |
| 4,538,978 A | 9/1985 | Cerboni | |
| 4,613,294 A | 9/1986 | Rose et al. | |
| 4,628,803 A * | 12/1986 | Bonora | A23G 1/10 366/139 |
| 4,629,131 A * | 12/1986 | Podell | F16P 3/10 241/36 |
| 4,649,810 A * | 3/1987 | Wong | A47J 43/044 99/326 |
| 4,664,529 A * | 5/1987 | Cavalli | A23G 9/12 366/144 |
| 4,679,498 A | 7/1987 | Chaveron et al. | |
| 4,693,610 A * | 9/1987 | Weiss | A47J 27/004 366/146 |
| 4,704,035 A * | 11/1987 | Kowalczyk | B01F 15/00207 366/142 |
| 4,751,357 A * | 6/1988 | Boulard | H05B 6/6411 219/754 |
| 4,763,568 A * | 8/1988 | Kiczek | A23L 7/187 219/400 |
| 4,773,233 A * | 9/1988 | Kawasumi | A23G 9/12 62/340 |
| 4,827,732 A * | 5/1989 | Suyama | A23G 9/12 62/155 |
| 4,838,702 A * | 6/1989 | Torimitsu | A23G 9/228 366/144 |
| 4,845,327 A * | 7/1989 | Iwabuchi | H05B 6/6411 219/754 |
| 4,860,461 A | 8/1989 | Tamaki et al. | |
| 4,877,410 A | 10/1989 | Renzulli et al. | |
| 4,884,626 A * | 12/1989 | Filipowski | F24C 7/087 165/231 |
| 4,903,588 A * | 2/1990 | Horiuchi | A21B 7/005 366/146 |
| 4,903,589 A * | 2/1990 | Aoyama | A21B 7/005 99/348 |
| 4,917,910 A | 4/1990 | Hsieh et al. | |
| 4,960,043 A * | 10/1990 | van Lengerich | A21C 1/065 366/291 |
| 4,993,593 A * | 2/1991 | Fabiano | A47J 36/16 219/442 |
| 4,998,678 A | 3/1991 | Durr | |
| 5,010,838 A | 4/1991 | Simelunas et al. | |
| 5,152,212 A * | 10/1992 | Chauveau | A23G 1/02 366/104 |
| 5,302,201 A | 4/1994 | Lucke | |
| 5,351,609 A * | 10/1994 | Muntener | A23G 1/125 366/158.4 |
| 5,363,746 A * | 11/1994 | Gordon | A23G 9/12 366/145 |
| 5,403,395 A | 4/1995 | McCullough et al. | |
| 5,412,171 A | 5/1995 | Yahav et al. | |
| 5,460,209 A * | 10/1995 | Jandura | G01G 13/024 141/104 |
| 5,476,550 A | 12/1995 | Walker | |
| 5,495,418 A | 2/1996 | Latini et al. | |
| 5,520,457 A | 5/1996 | Gontero et al. | |
| 5,605,090 A * | 2/1997 | Mantani | A21B 7/005 366/146 |
| 5,613,428 A | 3/1997 | Kendall et al. | |
| 5,615,951 A * | 4/1997 | Gabriele | B01F 7/00208 366/311 |
| 5,617,774 A * | 4/1997 | LaVelle | A47J 36/165 366/251 |
| 5,655,313 A | 8/1997 | Hope et al. | |
| 5,657,687 A * | 8/1997 | Callebaut | A23G 1/10 366/139 |
| 5,698,252 A | 12/1997 | Kelly et al. | |
| 5,755,880 A | 5/1998 | Norman et al. | |
| 5,771,600 A * | 6/1998 | Romanow | A23N 12/10 34/63 |
| 5,802,959 A | 9/1998 | Benson et al. | |
| 5,855,165 A | 1/1999 | Herrick, IV | |
| 5,858,431 A | 1/1999 | Wiedersatz | |
| 5,876,775 A | 3/1999 | Behnke et al. | |
| 5,911,827 A | 6/1999 | Heller | |
| 5,934,177 A * | 8/1999 | Takeda | A21B 7/005 99/327 |
| 5,972,398 A | 10/1999 | Ludwig et al. | |
| 6,003,240 A | 12/1999 | Akimoto et al. | |
| 6,007,418 A | 12/1999 | Suhner | |
| 6,007,859 A | 12/1999 | Taylor et al. | |

(56) References Cited

U.S. PATENT DOCUMENTS

| | | | |
|---|---|---|---|
| 6,056,988 A * | 5/2000 | Bangerter | A23G 3/0226 426/576 |
| 6,065,395 A | 5/2000 | Sollich | |
| 6,079,319 A | 6/2000 | Doria | |
| 6,103,285 A | 8/2000 | Guzman et al. | |
| 6,105,485 A | 8/2000 | Zittel | |
| 6,129,008 A * | 10/2000 | Muntener | A23G 1/125 366/147 |
| 6,145,432 A | 11/2000 | Bellue, Jr. | |
| 6,159,527 A | 12/2000 | Wettlaufer | |
| 6,180,158 B1 * | 1/2001 | Zietlow | A23G 3/0221 426/470 |
| 6,221,422 B1 * | 4/2001 | Kruger | A23G 1/125 426/631 |
| 6,238,724 B1 * | 5/2001 | Carvallo | A23G 1/12 426/631 |
| 6,267,049 B1 * | 7/2001 | Silvano | A23G 9/12 366/144 |
| 6,318,112 B1 | 11/2001 | Lennox, III | |
| 6,321,641 B1 * | 11/2001 | Wang | A21B 7/005 99/331 |
| 6,401,599 B1 * | 6/2002 | Maeda | A21B 7/005 366/146 |
| 6,427,584 B1 | 8/2002 | Thomas et al. | |
| 6,460,451 B1 | 10/2002 | Helman et al. | |
| 6,588,363 B1 | 7/2003 | Burke et al. | |
| 6,638,550 B2 | 10/2003 | Banko et al. | |
| 6,679,402 B1 * | 1/2004 | D'Alayer De Costemore D'Arc | A47J 31/4492 222/413 |
| 6,718,867 B2 | 4/2004 | Hatakeyama | |
| 6,755,149 B2 | 6/2004 | Herman | |
| 6,840,664 B2 | 1/2005 | Burke et al. | |
| 6,913,773 B2 | 7/2005 | Degady | |
| 6,997,134 B2 | 2/2006 | Bayus et al. | |
| 7,055,455 B2 | 6/2006 | Burke | |
| 7,153,533 B2 | 12/2006 | Burke | |
| 7,191,698 B2 | 3/2007 | Bond et al. | |
| 7,270,156 B2 * | 9/2007 | Beesley | A47J 27/004 141/82 |
| 7,350,457 B2 * | 4/2008 | Wessels | A47J 31/41 99/323.1 |
| 7,537,792 B2 | 5/2009 | Niekerk | |
| 7,681,818 B2 | 3/2010 | Peterson et al. | |
| 7,721,463 B2 | 5/2010 | Leon | |
| 7,867,537 B2 | 1/2011 | Karwowski et al. | |
| 7,878,109 B2 | 2/2011 | Calzada et al. | |
| 8,307,758 B2 | 11/2012 | Kobayashi et al. | |
| 8,323,711 B2 | 12/2012 | Brandt, Jr. et al. | |
| 8,460,731 B2 | 6/2013 | Mazin | |
| 8,603,259 B2 | 12/2013 | Berner et al. | |
| 8,707,862 B1 * | 4/2014 | Oliver | A47J 36/165 99/490 |
| 8,726,790 B2 * | 5/2014 | Lane | A47J 27/004 99/323.1 |
| 8,813,635 B2 * | 8/2014 | Dragan | A47J 27/17 99/349 |
| 8,906,442 B2 | 12/2014 | Stauffacher et al. | |
| 9,930,986 B2 * | 4/2018 | Arai | A47J 27/04 |
| 10,427,316 B2 * | 10/2019 | Beber | A47J 43/0722 |
| 10,463,057 B2 | 11/2019 | Saal et al. | |
| 2002/0009517 A1 | 1/2002 | Degady et al. | |
| 2002/0086091 A1 | 7/2002 | Degady et al. | |
| 2002/0086092 A1 | 7/2002 | Niekerk et al. | |
| 2002/0174779 A1 | 11/2002 | Friedl et al. | |
| 2004/0022908 A1 | 2/2004 | Kanaya et al. | |
| 2004/0043122 A1 | 3/2004 | Yakushigawa et al. | |
| 2004/0055474 A1 | 3/2004 | Lekic et al. | |
| 2004/0144263 A1 | 7/2004 | van Esbroeck et al. | |
| 2004/0249249 A1 | 12/2004 | Lawson et al. | |
| 2005/0092194 A1 | 5/2005 | Bajema et al. | |
| 2005/0115597 A1 * | 6/2005 | Carhuff | G07F 13/06 134/134 |
| 2005/0283053 A1 | 12/2005 | DeCharms | |
| 2006/0009697 A1 | 1/2006 | Banet et al. | |
| 2007/0061735 A1 | 3/2007 | Hoffberg et al. | |
| 2007/0095216 A1 | 5/2007 | Zittel et al. | |
| 2007/0202241 A1 * | 8/2007 | Abaurre | A23G 1/0036 426/660 |
| 2007/0208263 A1 | 9/2007 | John et al. | |
| 2007/0219455 A1 | 9/2007 | Nong et al. | |
| 2008/0029131 A1 | 2/2008 | Ecker | |
| 2008/0264273 A1 | 10/2008 | Stousland | |
| 2008/0274263 A1 | 11/2008 | Mazin | |
| 2008/0317907 A1 | 12/2008 | Thomas et al. | |
| 2009/0018405 A1 | 1/2009 | Katsumura et al. | |
| 2009/0202687 A1 * | 8/2009 | Griego | A23L 2/52 426/238 |
| 2009/0214733 A1 | 8/2009 | Garwood | |
| 2009/0223385 A1 * | 9/2009 | Heald | A23C 19/02 99/453 |
| 2010/0043649 A1 | 2/2010 | Maupin et al. | |
| 2010/0049004 A1 | 2/2010 | Edman et al. | |
| 2010/0050885 A1 * | 3/2010 | Vanderstegen-Drake | B30B 9/22 99/501 |
| 2010/0095852 A1 | 4/2010 | Remo et al. | |
| 2010/0107887 A1 | 5/2010 | Bentley et al. | |
| 2010/0151087 A1 * | 6/2010 | Dumarche | A23C 9/1307 426/103 |
| 2010/0159112 A1 * | 6/2010 | Madsen | A23L 21/12 426/615 |
| 2011/0034712 A1 | 2/2011 | Lin | |
| 2011/0041706 A1 * | 2/2011 | Whetstone, Jr. | A23G 1/26 99/353 |
| 2011/0048253 A1 | 3/2011 | Melandri et al. | |
| 2011/0104346 A1 | 5/2011 | Bowsman et al. | |
| 2011/0147507 A1 * | 6/2011 | van Leverink | B02C 17/183 241/101.8 |
| 2011/0183049 A1 * | 7/2011 | Simbuerger | A23G 1/0013 426/231 |
| 2011/0212238 A1 * | 9/2011 | Rose | A23G 1/0046 426/519 |
| 2011/0252981 A1 * | 10/2011 | Isenberg | F28F 3/14 99/453 |
| 2011/0256277 A1 | 10/2011 | Bows et al. | |
| 2011/0300286 A1 * | 12/2011 | Godfrey | A23G 1/0016 426/584 |
| 2012/0015085 A1 | 1/2012 | Liberatore | |
| 2012/0171344 A1 | 7/2012 | Rasanayagam et al. | |
| 2012/0225173 A1 | 9/2012 | Larson | |
| 2012/0251688 A1 * | 10/2012 | Zimmerman | A23G 1/50 426/383 |
| 2012/0260808 A1 | 10/2012 | Thomas | |
| 2012/0282371 A1 | 11/2012 | Miller | |
| 2013/0055907 A1 | 3/2013 | Brandt, Jr. | |
| 2013/0098847 A1 * | 4/2013 | Lambert | A47J 37/1223 210/744 |
| 2013/0142924 A1 | 6/2013 | Liberatore | |
| 2013/0340629 A1 | 12/2013 | Jetton et al. | |
| 2014/0026765 A1 * | 1/2014 | Fou | A47J 37/0704 99/445 |
| 2014/0199454 A1 | 7/2014 | Storek et al. | |
| 2014/0251161 A1 | 9/2014 | Matsushima et al. | |
| 2015/0118374 A1 * | 4/2015 | Kruiver | A23G 1/0036 426/487 |
| 2015/0297020 A1 * | 10/2015 | Castelli | A47J 31/4485 99/287 |
| 2016/0007638 A1 | 1/2016 | Fukumori et al. | |
| 2016/0205963 A1 | 7/2016 | Saal et al. | |
| 2019/0357559 A1 * | 11/2019 | Saal | A23G 1/12 |

FOREIGN PATENT DOCUMENTS

| | | |
|---|---|---|
| EP | 0140729 B1 | 4/1988 |
| EP | 0369066 A1 | 5/1990 |
| EP | 0796563 A2 | 9/1997 |
| EP | 1733625 B1 | 8/2008 |
| EP | 2187757 B1 | 12/2013 |
| EP | 3244748 A1 | 11/2017 |

(56) References Cited

FOREIGN PATENT DOCUMENTS

| | | |
|---|---|---|
| EP | 3244748 B1 | 11/2019 |
| EP | 3653060 A2 | 5/2020 |
| FR | 1033457 A | 7/1953 |
| JP | S47033150 B1 | 8/1972 |
| JP | S5934592 U | 3/1984 |
| JP | S61187929 A | 8/1986 |
| JP | S62195877 A | 8/1987 |
| JP | H0227957 A | 1/1990 |
| JP | H02023833 A | 1/1990 |
| JP | H02-180651 A | 7/1990 |
| JP | 2006-180786 A | 7/2006 |
| JP | 2007274912 A | 10/2007 |
| JP | 200980651 A | 4/2009 |
| JP | 3175819 U | 5/2012 |
| JP | 2012183314 A | 9/2012 |
| JP | 2014171446 A | 9/2014 |
| JP | 2018503400 A | 2/2018 |
| JP | 6463508 B | 2/2019 |
| JP | 2019062908 | 4/2019 |
| JP | 6672448 B2 | 3/2020 |
| KR | 1020130138076 A | 12/2013 |
| WO | WO20100068301 A1 | 2/2011 |
| WO | WO2013110795 A1 | 8/2013 |
| WO | WO2016115557 A1 | 7/2016 |

OTHER PUBLICATIONS

"International Search Report" & "Written Opinion", Patent Cooperation Treaty Application No. PCT/US2016/013806, dated Mar. 28, 2016, 15 pages.
"Extended European Search Report", European Patent Convention Application No. 16738035.1, dated Jul. 19, 2018, 5 pages.
"Search Report", Japanese Patent Application No. 2017-556783, dated Jun. 12, 2018, 24 pages [40 pages with translation].
"Office Action", Japanese Patent Application No. 2017-556783, dated Jul. 30, 2018, 3 pages [6 pages with translation].
"Notice of Allowance", Japanese Patent Application No. 2017-556783, dated Oct. 30, 2018, 3 pages [6 pages with translation].
"Notice of Allowance", European Patent Convention Application No. 16738035.1, dated Jun. 27, 2019, 5 pages.
"Notice of Allowance", Japanese Patent Application No. 2018-247833, dated Feb. 4, 2020, 3 pages [4 pages with translation].
"Extended European Search Report", European Patent Convention Application No. 19211088.0, dated Jul. 6, 2020, 9 pages.
Japan Patent Office, Notice of Reasons for Refusal, JP Patent Application No. 2020-036414, dated Mar. 2, 2021, eight pages.
The Japan Patent Office, Notice of Reasons for Refusal, Japanese Patent Application No. 2020-036414, dated Feb. 1, 2022, 10 pages.

* cited by examiner

CHOCOLATE PROCESSING SYSTEM AND METHOD

CROSS-REFERENCE TO RELATED APPLICATIONS

This continuing application claims the priority benefit of U.S. Non-Provisional patent application Ser. No. 14/997,983 filed on Jan. 18, 2016, titled "Chocolate Processing System and Method," which in turn claims the priority benefit of U.S. Provisional Application Ser. No. 62/104,195 filed Jan. 16, 2015, all of which are incorporated in their entireties herein by this reference.

TECHNICAL FIELD

This invention relates generally to the chocolate making field, and more specifically to a new and useful tabletop batch processing system in the chocolate making field.

BACKGROUND

Chocolate processing and production involves a varied set of techniques and apparatus, often highly dependent on the end-user and the desired final chocolate product. Historically, chocolate processing and production has been the purview of large-scale industrial producers or individuals working with disparate tools and inconsistent methods. Several types of processing that are commonly involved in the production of chocolate include: grinding, refining, mixing, conching, tempering, extracting, molding, cooling, heating, and other processing steps and/or techniques. Smaller, specialized equipment and techniques have recently been developed to bring chocolate processing technology to individual users and small businesses; however, such systems and methods suffer from a number of drawbacks. In particular, many systems are overly specialized (e.g., perform only a single step of processing, can accomplish a limited number of the full set of processing steps, etc.), result in inconsistent or undesirable chocolate product (e.g., produce highly polycrystalline forms of chocolate, fat-blooms on the chocolate surface, etc.), require highly specialized or technical knowledge to operate (e.g., systems that lack a simplified user interface), and are excessively costly for an individual user to own and operate (e.g., industrially scalable systems).

Furthermore, construction of fully integrated automatable chocolate processing systems that are accessible to a variety of end-users (e.g., industrial producers, small business producers, hobbyists, etc.) at a reasonable cost is particularly challenging. Challenges include: performing the various steps of the production process (e.g., grinding, refining, conching, tempering, extracting, molding, etc.) within the same system; keeping such a capable system within a small form factor (e.g., tabletop, benchtop, etc.); controlling the operating parameters of the system so as to achieve repeatable chocolate production between batches (e.g., similar consistencies, flavors, etc.); controlling the temporal profile of important characteristics (e.g., temperature) of the chocolate during production; cleaning the system in between production batches; and automating the entire processing and production procedure.

There is thus a need in the chocolate production field to create a new and useful automated chocolate processing system and method of processing chocolate. This invention provides such a new and useful system and method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. System Overview

Figure 1:
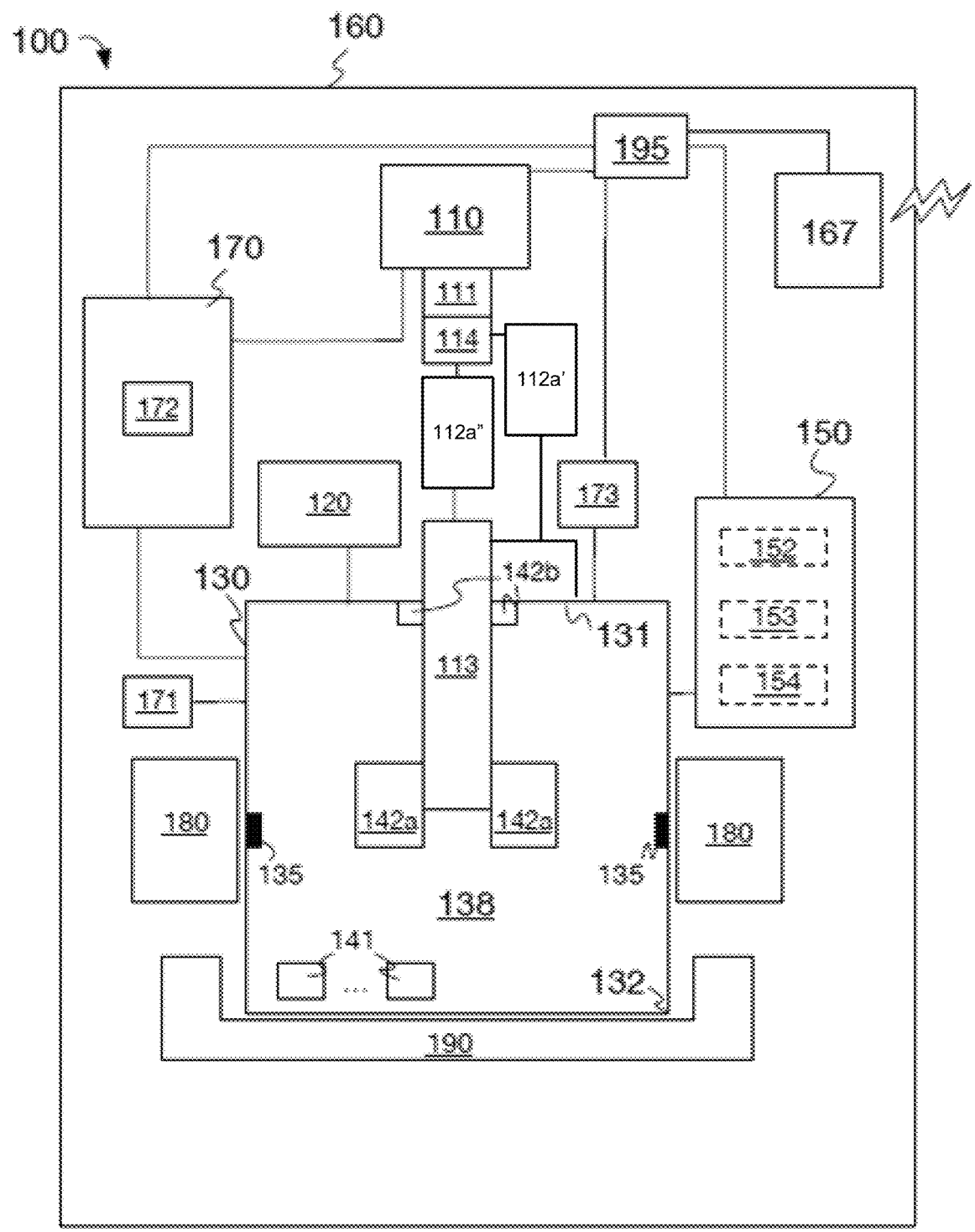
FIG. 1 is a schematic depiction of a variation of the system.

As shown in FIG. 1, a system 100 for automated foodstuff processing includes a drive mechanism 110, a chamber 130 rotatably coupled to the drive mechanism 110, a reducer 141 arranged within the chamber interior (chamber lumen 138), and an extraction mechanism 150 fluidly coupled to the chamber lumen 138. The system 100 can additionally include a temperature control system 170 thermally couplable to the chamber 130, a precursor dispenser 120 coupled to an inlet of the chamber 130, a shaft 113 (processing shaft 113) rotatably coupled to the drive mechanism 110 and arranged within the chamber 130, and a processor 195 configured to operate the system 100 between a number of modes. The system 100 can additionally include a molding system (e.g., a mold 180) fluidly coupled (or fluidly couplable) to the chamber. The system 100 functions to automatically process chocolate precursors (e.g., ingredients and flavorings, chocolate nibs, cocoa butter, etc.) into chocolate.

The system 100 preferably processes chocolate precursors into chocolate, but can alternatively process nut butter precursors into nut butter, or process any other suitable foodstuff precursors into foodstuff. The system 100 preferably grinds, refines, and extracts the chocolate, and can additionally temper, conch, and/or mold the chocolate. The resultant chocolate can be liquid chocolate including one or more crystalline forms, seeded liquid chocolate seeded with one or more crystalline forms (e.g., Form V crystals), solid chocolate, or chocolate having any other suitable state of matter. While the system 100 preferably processes chocolate precursors into chocolate, the system 100 can additionally or alternatively process or include coffee, nuts, fruits, or any other suitable combination of material or precursors. The system 100 can additionally mix the chocolate and/or chocolate precursors with a liquid to create a drinkable chocolate product.

The system 100 is preferably operable between a plurality of modes, wherein each mode is preferably associated with a single chocolate-making process. For example, the plurality of modes can include: grinding, refining, conching, tempering, extracting, molding, cooling and/or any other suitable mode. The modes are preferably mutually distinct, but can alternatively overlap, such that one or more processes are performed in a single mode. The modes are preferably performed serially (e.g., sequentially) by the system, but one or more of the modes can alternatively be performed concurrently or in any other suitable order. Alternatively, the system 100 can be operable in a single mode, or be operable between any other suitable set of modes. The modes are preferably selected and/or controlled by the processor 195, but can additionally or alternatively be selected and/or controlled by input from a user, a plurality of communicatively coupled processors 195, through sole control by a user or operator of the system, or selected and/or controlled in any other suitable manner.

The system 100 preferably receives chocolate precursors from an ingredient package (e.g., a pod or packet) enclosing a set of chocolate precursors at predetermined ratios for a batch, but can alternatively receive the chocolate precursors from a set of repositories (e.g., precursor dispensers, hoppers), each repository retaining a different ingredient, or receive the chocolate precursors from any other suitable dispensation system (e.g., from a user-controlled system or dispenser) at user-defined ratios or any other suitable precursor ratio. In variations including a precursor dispenser 120, the precursor dispenser 120 preferably includes an actuatable compartment coupled to the precursor inlet of the chamber 130 (e.g., a hopper, an autofeeder, etc.). The system 100 can be manually operated, automatically operated (e.g., in response to the depression of a button or the satisfaction of a predetermined condition, such as a start time), remotely operated (e.g., over a wireless data connection), or operated in any other suitable manner.

In one variation, the system 100 is configured for tabletop use. In this variation, the system 100 can have a footprint smaller than 3 ft by 3 ft, more preferably less than 2 ft by 2 ft, but can alternatively have a larger footprint (e.g., 5 ft by 5 ft) or any other suitable footprint. The system 100 can achieve such small dimensions by batch processing, leveraging a single, multi-use chamber 130 that supports grinding, refining, and extraction, and leveraging a single, multi-use drive mechanism 110 that generates the requisite force for grinding, refining, and extraction. The system 100 can additionally function to conch, temper, and/or mold the chocolate. However, the system 100 can perform any suitable combination of processing steps, be a continuous flow system, include any suitable number of chambers for each processing step, any suitable number of drive mechanisms 110 for each processing step, or have any other suitable configuration.

In a specific variation, the system 100 utilizes the same components (or subset thereof) for grinding, refining, and extraction. The same components can additionally be used to conch, temper, and/or mold the chocolate. The multi-use components of the system 100 preferably include a rotary drive mechanism 110a (e.g., a motor), a processing shaft 113, an agitation mechanism 142 (e.g., agitator, impeller), a reducer 141 (e.g., reduction media, set of balls, spheroids, grinding stones, plates, pins, rollers), and an impact surface 143 (e.g., walls, base of the chamber 130, interior surface 133 of the chamber 130, surface of adjacent reducers 141, etc.). The rotary drive mechanism 110a and related components are preferably operable between a first mode (e.g., a grinding mode, a reducing mode), a second mode (e.g., a mixing mode, a conching mode, a tempering mode), a third mode (e.g., an extraction mode), and a fourth mode (e.g., a molding mode, a cooling mode, a curing mode), wherein the modes are preferably performed in series but can alternatively be performed in parallel or a mix thereof. However, the rotary drive mechanism 110a and related components can be operable between any suitable number of modes. This and other variations can additionally include a balance ring 190, that functions to counteract some or all of the rotational imbalance of the system 100 produces by the rotation of the chamber 130 in any of the described modes. However, the system 100 can be configured in any other suitable manner.

In some variations, the system 100 can be operated in a self-cleaning mode or any other suitable cleaning mode. The self-cleaning mode preferably includes introducing a cleaning agent (e.g., solvent, detergent, solution, powder, liquid, etc.) into the chamber 130, as well as rotating components of the system 100 (e.g., the chamber 130, the reducer(s) 141, the agitator, etc.) in order to remove remaining and/or unwanted chocolate product from the system 100 after use. The self-cleaning mode can additionally or alternatively include controlling various system parameters (e.g., temperature, pressure, speed) to aid in cleaning. For example, the chamber 130 can be heated in order to melt residual chocolate and improve the efficacy of any introduced cleaning agents. However, the system components can be operated in any other suitable manner in the cleaning mode.

1.1 Benefits

Variants of this system can confer several benefits over conventional chocolate processing systems. First, the system 100 can both achieve a small footprint and reduce the number of cleanup steps by confining the processing steps to a single chamber. Second, the system 100 can achieve the small footprint by generating the various forces required for each process step with the same drive mechanism 110. Third, variations of the system 100 can additionally minimize the size of the chocolate processing system by actively controlling the temperature within the chamber lumen 138 (e.g., for tempering, conching, etc.). Because the chocolate batches are relatively small (e.g., on the order of 250 g, 300 g, 500 g, 1000 g, less than 25 lbs., etc.) and continuously agitated, the chamber lumen 138 temperature can be controlled by conduction (e.g., through the walls), convection (e.g., by flowing ambient, cooled, heated, dried, or otherwise treated fluid through the lumen), or cooled and/or heated in any other suitable manner. Fourth, variations of the system 100 can additionally minimize the size of the chocolate processing system by using waste heat from the drive mechanism 110 or friction generated by the agitation mechanism 142 and reducers 141 to heat the chocolate ingredients and leveraging the resultant vibration from system to vibrate the liquid chocolate to reduce viscosity and/or apply a bubble removal force (e.g., centrifugal force) to the extrusion molds to minimize gas bubbles. Fifth, the system 100 reduces human error, eases the chocolate making process, and adds customizability to the end product by automatically determining and controlling the system 100 to operate based on a set of predetermined operation parameters (e.g., RPM, agitation duration, wait duration, temperature, ingredient introduction order, etc.). The operation parameters can be automatically determined (e.g., read, retrieved from a remote system, etc.) based on the received ingredients, from the ingredient packaging (e.g., a barcode, packaging size, packaging shape, packaging color, package weight, etc.), a received user selection, or automatically determined in any other suitable manner. Alternatively, the operation parameters can be received from a user (e.g., from a user device, social networking system, etc.) or received from any other suitable source. Sixth, the system 100 can streamline the production process by integrating molding into the radial extraction process, obviating the need for additional steps in producing chocolate suitable for packaging and sale.

1.2 Drive Mechanism

The drive mechanism 110 of the system 100 functions to rotate both the drive shaft 111 and the chamber 130, together or separately, during various operating modes of the system. The drive mechanism 110 can additionally function to rotate and/or agitate the reducers 141 (e.g., grinding and/or refining media, reducing media, grinding stones, plates, pins, rollers), wherein the agitated reducers 141 function to grind and/or refine the chocolate precursors (e.g., ingredients, material), actuate the chamber 130 (e.g., rotate the chamber 130 about a rotational axis) to generate centrifugal force to extract the chocolate, generate waste heat or friction that can be used to heat the chocolate precursors, move the chamber 130 and/or contents relative to ambient fluid (e.g., air) to cool the chamber 130 and/or contents (e.g., through convection), or be used in any other suitable manner. The drive mechanism 110 preferably generates rotational motion, but can alternatively generate linear motion (e.g., reciprocating motion), or generate motion along any other suitable vector. The drive mechanism 110 is preferably an electric motor, but can alternatively be a pneumatic motor, a hydraulic motor, or any other suitable drive mechanism. Other specific examples of the drive mechanism 110 include a revolving drum, vibratory mixer, and a reciprocating agitation mechanism (e.g., imparting a nutating motion on the chamber 130). These drive mechanisms 110 can be coupled with internal chamber fins (e.g., blades 142a) extending radially inward toward the chamber 130 central axis, reduction mechanisms, or any other suitable mixing feature. However, the drive mechanism 110 can be configured in any other suitable manner.

Figure 2:
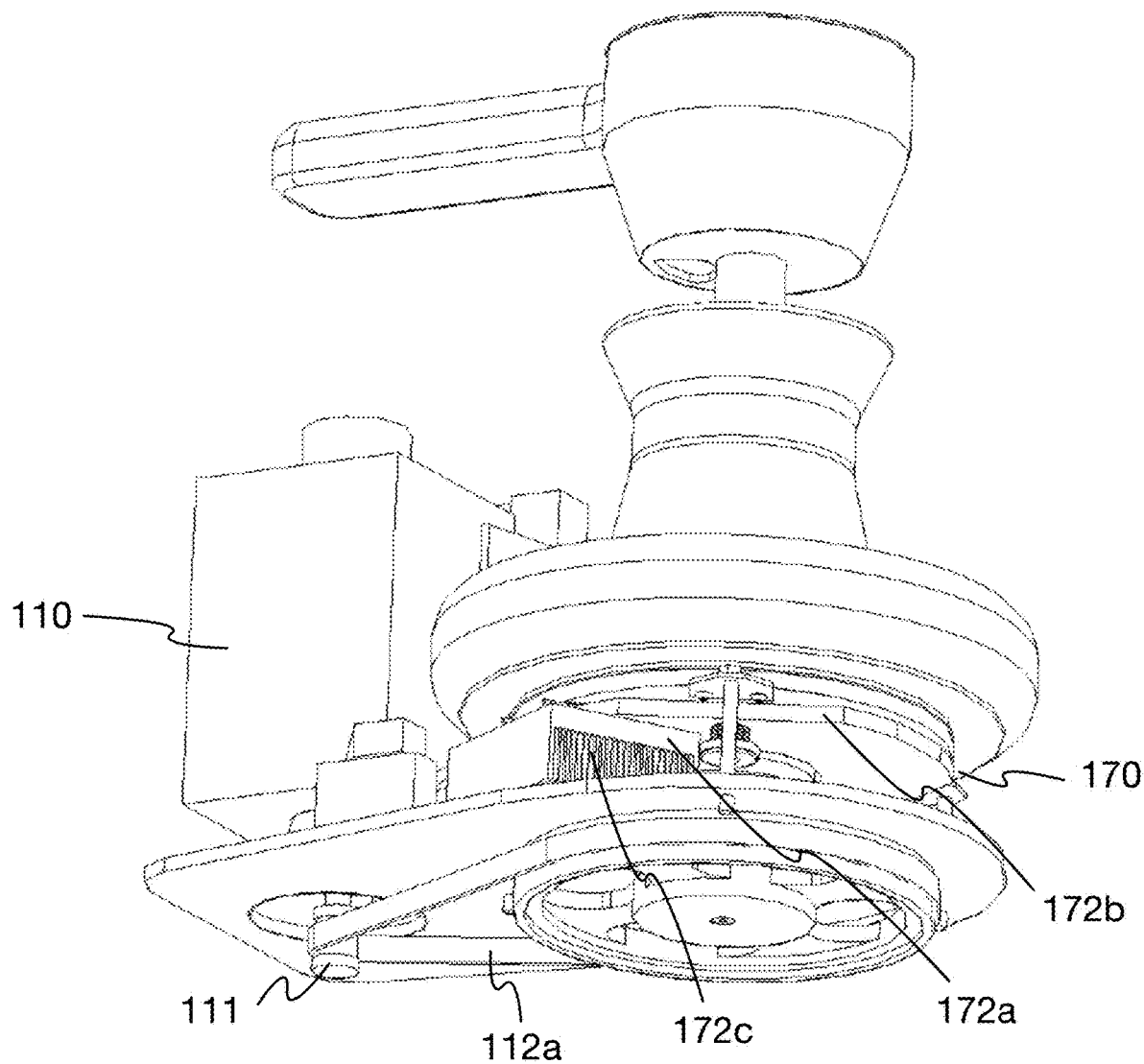
FIG. 2 is a perspective view of the temperature control system, chamber, drive mechanism, and associated components of a variation of the system.
Figure 15:
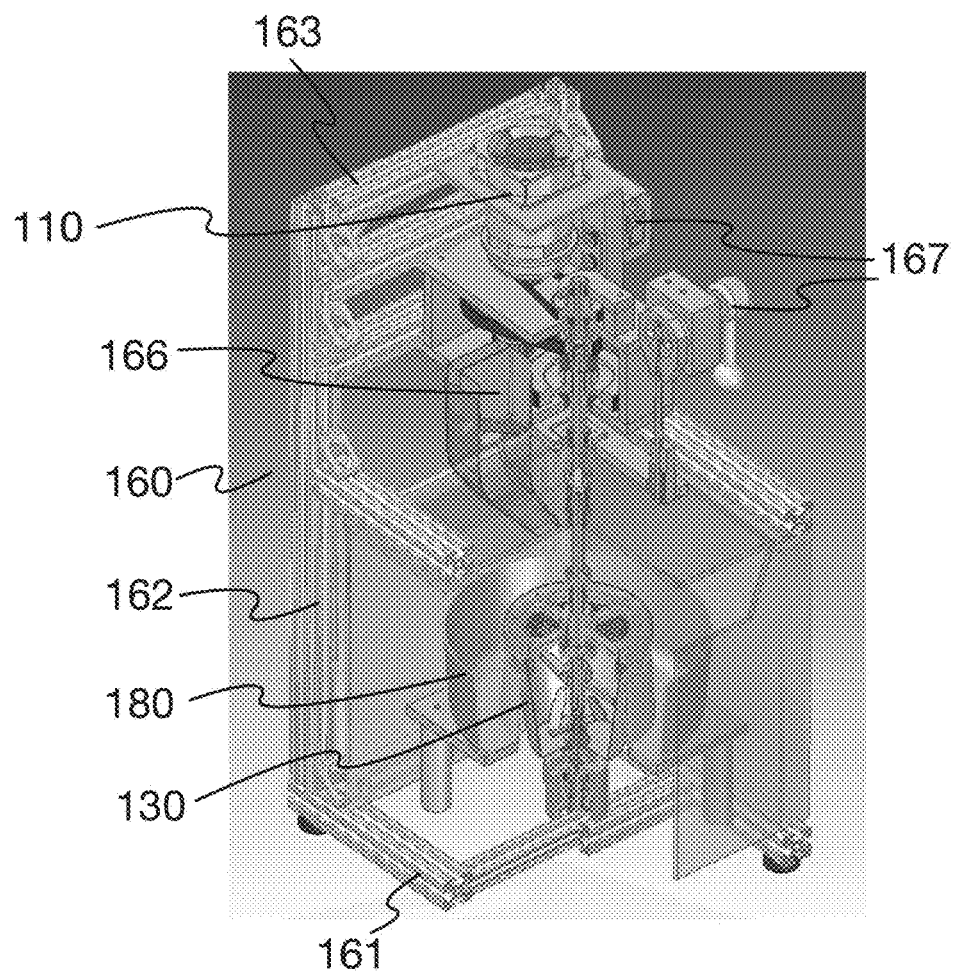
FIG. 15 is an illustration of a variation of the system, including the frame and various components of the frame.

The drive mechanism 110 is preferably positioned adjacent to the chamber 130, more preferably in a lateral direction, in order to minimize the footprint of the system. An example arrangement of the drive mechanism 110 relative to the chamber 130 is depicted in FIG. 2. Alternatively, the drive mechanism 110 can be arranged coaxially with the rotation axis of the chamber 130, above or below the chamber 130, or arranged in any other suitable configuration. An example alternative arrangement of the drive mechanism 110 relative to the chamber 130 is depicted in FIG. 15. In some variations, the drive mechanism 110 can be positioned below the chamber 130, coaxially or offset, and coupled to a central shaft. In other variants, the drive mechanism 110 can be positioned below the chamber 130, and a central shaft can be omitted. The drive mechanism 110 preferably includes a drive shaft 111, but can alternatively include a rotor or any other suitable power output.

Figure 5:
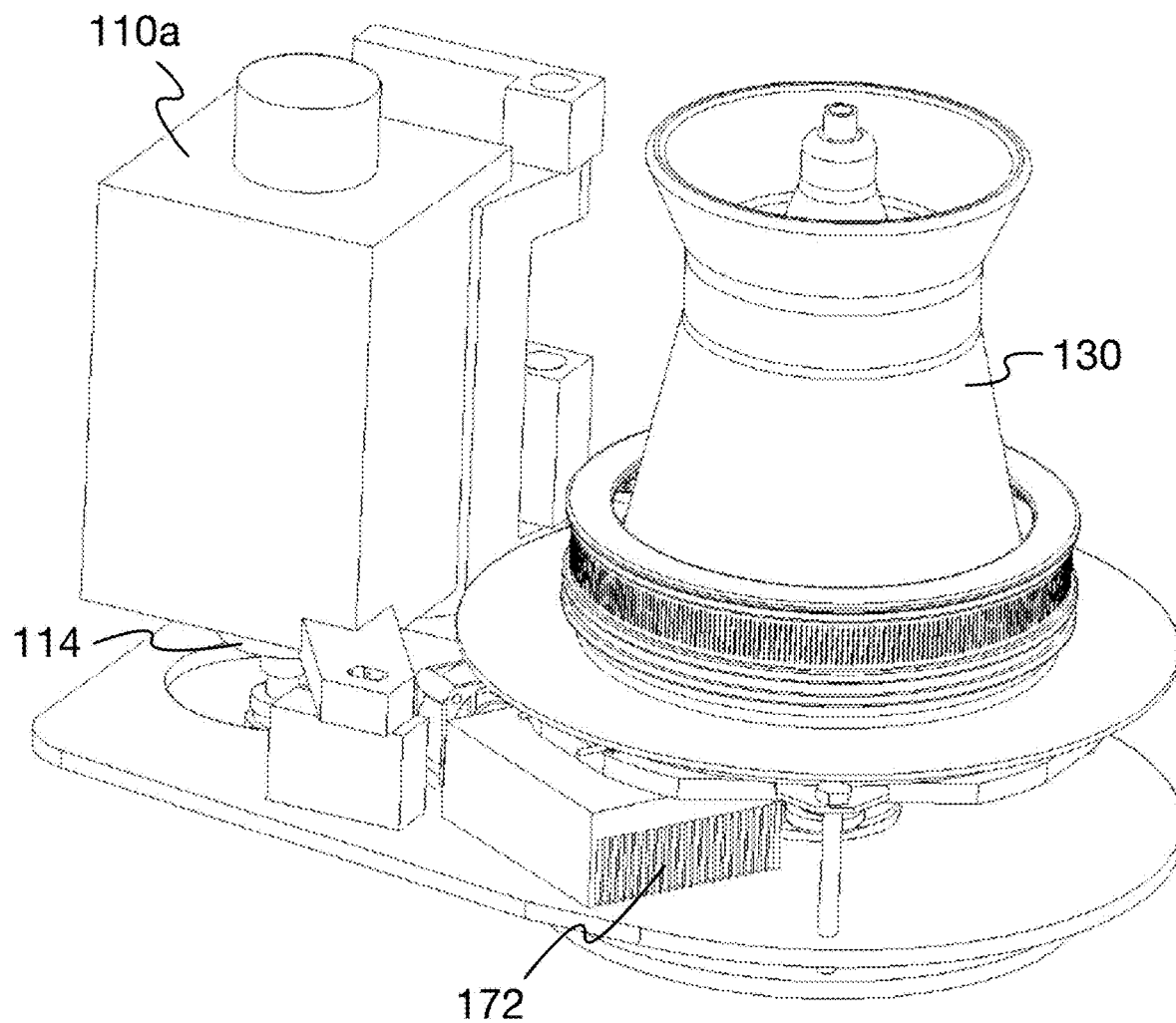
FIG. 5 is a perspective view of a variation of the system including a rotary drive mechanism, and depicting a filter in the extraction region.

The drive mechanism 110 is preferably selectively connectable to the agitation mechanism 142, chamber 130, reducer 141, and/or any other suitable component, but can alternatively be permanently connected to the respective component. The drive mechanism 110 can additionally include and/or be mechanically connected to a power transfer mechanism 112 that functions to transfer the output power and/or motion to the agitation mechanism 142, chamber 130, reducer 141, and/or any other suitable endpoint. The power transfer mechanism 112 can be a drive belt 112a, chain, clutch, gear, or any other suitable power transfer mechanism. The power transfer mechanism 112 and/or power output can be connected to an end of the agitation mechanism 142, a sprocket of the agitation mechanism 142, the agitation mechanism body, or any other suitable portion of the agitation mechanism 142. In some variations, the drive mechanism 110 can be coupled to the chamber 130 directly and the agitation mechanism 142 indirectly, such that rotating the chamber 130 with the drive mechanism 110 causes the agitation mechanism 142 to rotate. As shown in FIG. 5, the drive mechanism 110 (and/or rotary drive mechanism 110a) can additionally or alternatively include a variable-ratio (e.g., variable reduction, variable speed) gearbox 114, which can function to enable the rotation of the chamber 130 and/or shaft at a range of speeds (e.g., RPM). The drive mechanism 110 can also include any other suitable power transfer component or be configured in any other suitable manner.

In a specific variation, the drive mechanism 110 includes an electric motor and a drive shaft 111. In this variation, the drive shaft 111 is coupled to the processing shaft 113 and the chamber 130 and configured to rotate the processing shaft 113 at a first angular velocity and the chamber 130 at a second angular velocity during operation. In a first example, the drive shaft 111 is coupled to the chamber 130 with a first drive component 112a' (e.g., first drive belt), and to the processing shaft 113 with a second drive component 112a" (e.g., second drive belt), wherein the first and second drive components can be driven at independent speeds through a transmission system. In a second example, the drive shaft 111 is coupled to the processing shaft 113 with a drive component 112a, and the chamber 130 is selectively statically coupleable to the processing shaft 113, such that the chamber 130 can rotate with the processing shaft 113 or be stationary relative to the processing shaft 113. The first angular velocity and the second angular velocity are preferably different, but can alternatively be the same angular velocity. The first and second angular velocities can be positive (e.g., counterclockwise), negative (e.g., clockwise), or zero. The processing shaft 113 and the chamber 130 can be rotated simultaneously in the same or opposite directions, but can alternatively be rotated serially, sequentially, in an alternating fashion, or in any other suitable manner. The drive shaft 111 is preferably coupled to the processing shaft 113 and/or the chamber 130 via one or more drive components 112a (e.g., drive belts), but can alternatively be coupled to either the processing shaft 113 or the chamber 130 by any suitable mechanism for the transfer of rotational force (e.g., a shaft coupler, chain and sprocket, set of gears, etc.). This and other variations can additionally or alternatively include a variable speed transmission between the drive shaft 111 and the processing shaft 113 and/or the chamber. However, the drive mechanism 110 can be otherwise configured.

In a specific example of drive mechanism operation, the rotary drive mechanism 110a (e.g., a motor), operating in the first mode (e.g., a grinding mode, a refining mode, a reducing mode), rotates a shaft 113 (e.g., processing shaft) coupled to an agitation mechanism (e.g., agitator, impeller) that drives the reducer(s) 141 (e.g., balls 141a, spheroids) into an impact surface 143 (e.g., walls, base 132 of the chamber 130, interior surface 133 of the chamber 130, surface of adjacent reducers 141, etc.), thereby grinding, refining, and reducing the average particle size of the chocolate precursors. In a second mode (e.g., a mixing mode, a conching mode, a tempering mode, etc.), the rotary drive mechanism 110a rotates the shaft and agitator to agitate the liquid chocolate during the conching and/or tempering process; In a third mode (e.g., an extraction mode), the rotary drive mechanism 110a rotates the chamber 130 (and, in some variants, the shaft) to extract liquid chocolate from the chamber lumen 138 using centrifugal force. In a fourth mode (e.g., a molding mode, a cooling mode, a curing mode, etc.), the rotary drive mechanism 110a rotates the chamber 130 to keep the chocolate in the mold ring and minimize gas bubbles in the chocolate. The chocolate in the mold ring can additionally be cooled (e.g., via convection, actively cooled, etc.). However, the rotary drive mechanism 110a can be operable between any suitable number of modes. In this example, the agitation mechanism 142 is preferably rotatably coupled to the chamber 130 in the first and second modes, and statically coupled to the chamber 130 in the third and/or fourth modes.

1.3 Frame

As shown in FIGS. 1 and 15, the system 100 can additionally include a frame 160 that retains the chamber. The frame 160 can additionally or alternatively transiently or substantially permanently retain the drive mechanism 110, the agitation mechanism 142, the reducer 141, the extraction mechanism, the temperature control system 170, the precursor dispenser 120, the shaft, the processor 195, and/or any other suitable component in relation with other system components. The components can be statically retained, movably retained, substantially permanently retained, transiently retained, or otherwise retained by the frame 160. The frame 160 can additionally function to define an inertial reference frame 160 of the overall system relative to various moving components of the system 100 (e.g., the chamber 130, the processing shaft 113, the drive mechanism 110, etc.).

The frame 160 preferably includes a base 161, and can additionally include side supports 162, a top 163, or any other suitable component. The system 100 components are preferably mounted to the base 161, but can alternatively be mounted to the top 163, sides, or any other suitable portion of the frame 160. The frame 160 preferably defines a lumen (e.g., chamber 130 retention lumen, etc.), wherein the chamber 130, drive mechanism 110, and/or other system components can be arranged within the lumen. However, the system 100 components can be arranged outside of the lumen or in any other suitable configuration. The lumen can be substantially sealed (e.g., include walls), partially sealed, entirely open, or otherwise configured. The lumen parameters (e.g., temperature, pressure, fluid flow, etc.) are preferably controllable, but can alternatively be open to ambient.

The frame 160 can retain the ingredient dispenser 120 (precursor dispenser 120) relative to the material inlet 134 (precursor inlet) of the chamber 130. The frame 160 can retain the ingredient dispensation system proximal (e.g., against) the material inlet 134, additionally include a set of ingredient manifolds fluidly connecting the ingredient dispensation system with the material inlet 134, or include any other suitable ingredient transfer system.

The frame 160 can retain the chamber 130 relative to the drive mechanism 110 within a chamber retention lumen. The frame 160 can statically retain the chamber 130, rotationally retain the chamber 130 (e.g., wherein the chamber 130 rotates within the chamber retention lumen, relative to the frame 160), or otherwise retain the chamber. The chamber 130 can be arranged within the lumen of the frame 160 with the chamber 130 longitudinal axis substantially parallel a gravity vector and/or frame 160 longitudinal axis, arranged at a non-zero angle relative to a gravity vector and/or frame 160 longitudinal axis, or arranged in any other suitable position.

The frame 160 preferably retains the drive mechanism 110 laterally relative to the chamber 130 (e.g., wherein the drive mechanism 110 is arranged beside the chamber 130, wherein the drive mechanism 110 and chamber 130 are mounted to the frame base 161, etc.), but can alternatively or additionally retain the drive mechanism 110 position relative to an end of the chamber 130 (e.g., wherein the drive mechanism 110 and chamber 130 are substantially coaxial or slightly offset), a chamber 130 feature (e.g., retain the drive mechanism 110 proximal the material inlet 134, retain the drive mechanism 110 proximal the chamber 130 second end 132 opposing the material inlet 134, retain the drive mechanism 110 proximal a wall of the chamber 130, proximate an arcuate surface of the chamber 130, etc.), or retain the drive mechanism 110 in any other suitable position relative to the chamber 130 or chamber 130 retention lumen. The body of the drive mechanism 110 is preferably substantially statically retained within the frame 160 (e.g., statically mounted to the frame), but can alternatively actuate relative to the frame. In one example, the system components can be suspended within the frame. In a second example, the system components can be mounted to the frame with a damping system. However, the drive mechanism 110 can be otherwise retained relative to the chamber.

The frame 160 can additionally include a material management system 166 that functions to facilitate chocolate precursor introduction into the lumen. The material management system 166 can additionally function to support the ingredient dispensation system, operate the ingredient dispensation system (e.g., open different compartments of the ingredient dispensation system in a predetermined order), control the ingredient mass dispensed (e.g., by weight, volume, dispensation time, etc.), or operate in any other suitable manner. The material management system 166 can control the temperature of the ingredient dispensation system or the contents thereof (e.g., warm or cool the ingredients), vibrate the ingredient dispensation system or the contents thereof, or otherwise facilitate with material egress out of the ingredient dispensation system into the chamber. In one variation, ingredients (e.g., cocoa butter) can be heated by the material management system 166 and introduced to the chamber 130 in a fluid state (e.g., by dripping, flowing, pouring, etc.). In a second variation, ingredients (e.g., cocoa nibs) can be pre-heated by the material management system 166 prior to introduction to the chamber. The material management system 166 can be controlled by the processor 195 or by another control module. The material management system 166 can use waste heat from the other system components, be thermally connected to the temperature control system 170, include a secondary temperature control system 170, or control ingredient temperatures in any other suitable manner. The material management system 166 can be connected to the drive mechanism 110 or include a separate, secondary drive mechanism 110 (e.g., electric motor, crank, etc.). Alternatively or additionally, the material management system 166 can include any other suitable component.

The frame 160 can additionally include a user interface 167 that functions to allow a user to provide input to and/or receive output from the system. Input preferably includes operating conditions (e.g., parameters, times, features, styles, etc.) of the system, but can additionally or alternatively include any suitable form of input. Output preferably includes results (e.g., success or failure, product quality, time history, etc.) of the operation of the system, but can additionally or alternatively include any suitable form of output. Examples of the user interface 167 include: a screen (e.g., a capacitive touch screen), speakers, a microphone, switches, buttons, a wired data link (e.g., USB, Ethernet, Thunderbolt, Lightning, RS-232, other serial or parallel data connections, etc.), a wireless data link (e.g., Wi-Fi, Bluetooth, NFC, RFID, radio, other serial or parallel wireless data connections, etc.), or any other suitable user input, output, or combination thereof. The user interface 167 can also include one or more processors 195 for on-board computing and control. Examples of the user interface (e.g., user device) include: a phone, tablet, laptop, smartwatch, or any other suitable user input and/or output device. However, the user interface 167 can additionally or alternatively include any other suitable interface components or be configured in any other suitable manner.

1.4 Chamber

As shown in FIG. 2, the chamber 130 of the system 100 functions to receive chocolate precursors and contain the chocolate precursors during the grinding, refining, tempering, and/or conching steps. The chamber 130 can additionally function as a force element (e.g., an impact surface) for the grinding and refining steps. The chamber 130 can additionally function as a temperature control system 170 and/or as a heat transfer medium in conjunction with a temperature control system 170. The chamber 130 can additionally function as a guide during the processing and extraction steps (e.g., the internal surface can direct material to be extracted toward an extraction point, create a desired reducer flow within the chamber, such as by guiding the reducers to fall in on themselves during actuation, etc.). The chamber 130 can additionally function to enclose all or a portion of the reduction mechanism. In one variation of the system, the chamber 130 retains the reducers 141 (e.g., reduction mechanism) and the active end of the agitation mechanism 142 (e.g., the agitation mechanism end including the blades 142*a*). However, the reduction mechanism can be entirely arranged outside the chamber 130 or be otherwise configured. However, the chamber 130 can be used in any other suitable manner. In some variations, the chamber 130 can additionally or alternatively be entirely enclosed by the frame 160, such that internal and/or external chamber 130 parameters (e.g., temperature, pressure, etc.) can be controlled by the system.

Figure 9:
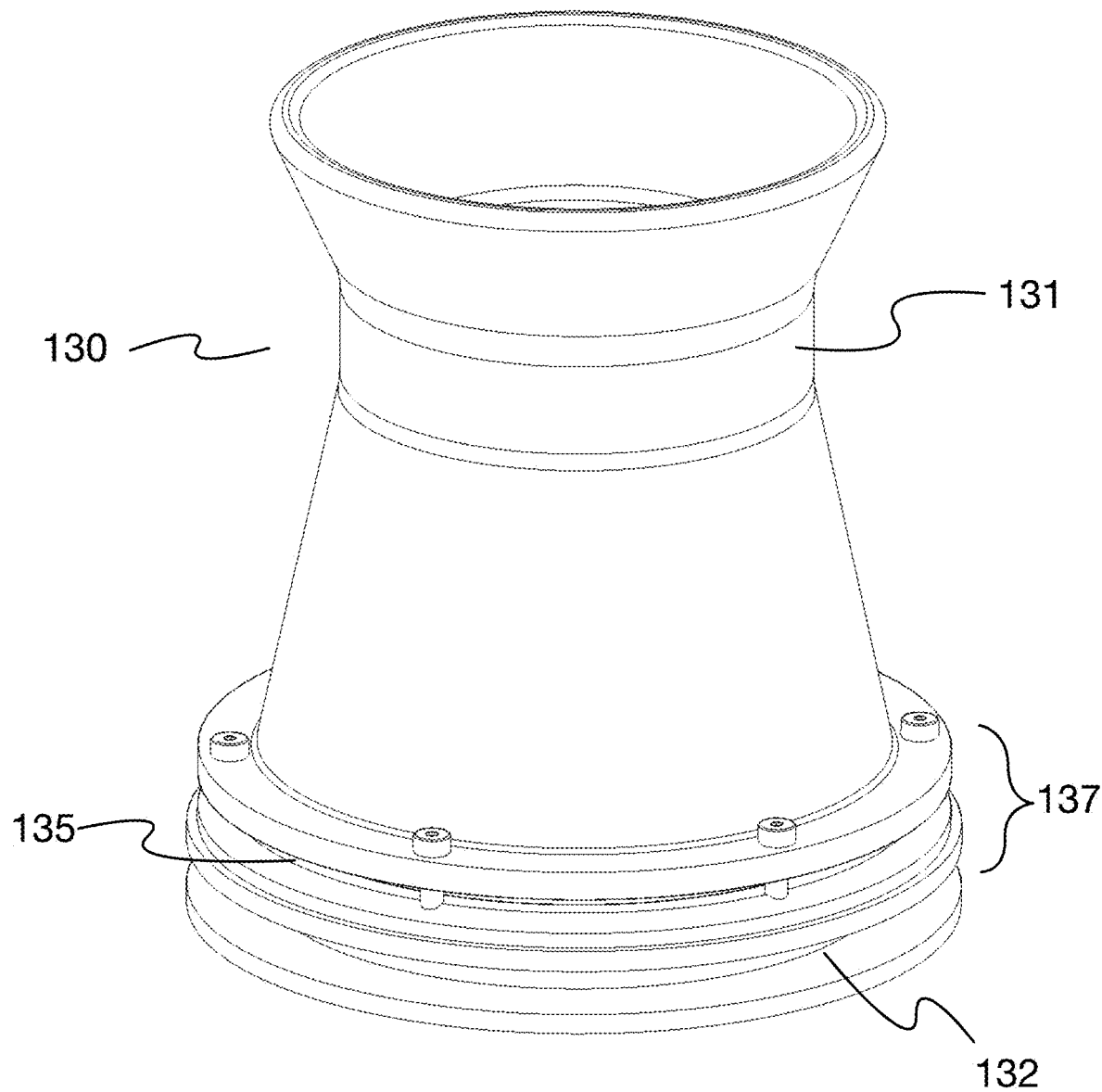
FIG. 9 is a perspective view of a variation of the chamber including the extraction region without a filter.

The chamber 130 preferably includes a first end 131 defining a material inlet 134, a second end 132, and a set of chamber walls, wherein the set of chamber walls preferably cooperatively define a chamber lumen 138 with the first end 131 and/or second end 132. However, the chamber 130 can be formed in any other suitable manner. The chamber 130 can additionally define a material outlet 135 through which product (e.g., chocolate) can be extracted. The material outlet 135 is preferably located within the extraction region 137, as shown in FIG. 9, but can alternatively be positioned at another portion of the chamber 130, such as the second end 132, or in any other suitable position. The chamber 130 can be double-walled, single-walled, include a removable insert, or include any other suitable construction. However, the chamber 130 can be otherwise configured. The first end 131, chamber walls, and second end 132 are preferably substantially permanently coupled (e.g., manufactured as a unitary piece, welded together, riveted together, bonded together, molded together, clamped together, etc.), but can alternatively be transiently coupled by a transient coupling mechanism (e.g., a set of complimentary clips, threads, screws, bolts, adhesive, etc.), actuatably coupled (e.g., wherein a first end 131 of the chamber 130 can rotate or linearly translate relative to a second end 132 of the chamber 130), or otherwise retained. The chamber 130 is preferably formed from an oleophobic polymer, but can alternatively be formed from an oleophilic polymer, hydrophilic or hydrophobic polymer, metal, ceramic, or any other combination of suitable materials. Alternatively or additionally, the chamber 130 can include a hydrophilic, hydrophobic, oleophilic, oleophilic, or any other suitable type of coating along the chamber interior and/or exterior. Alternatively, different chamber components can be formed from different materials.

Figure 16:
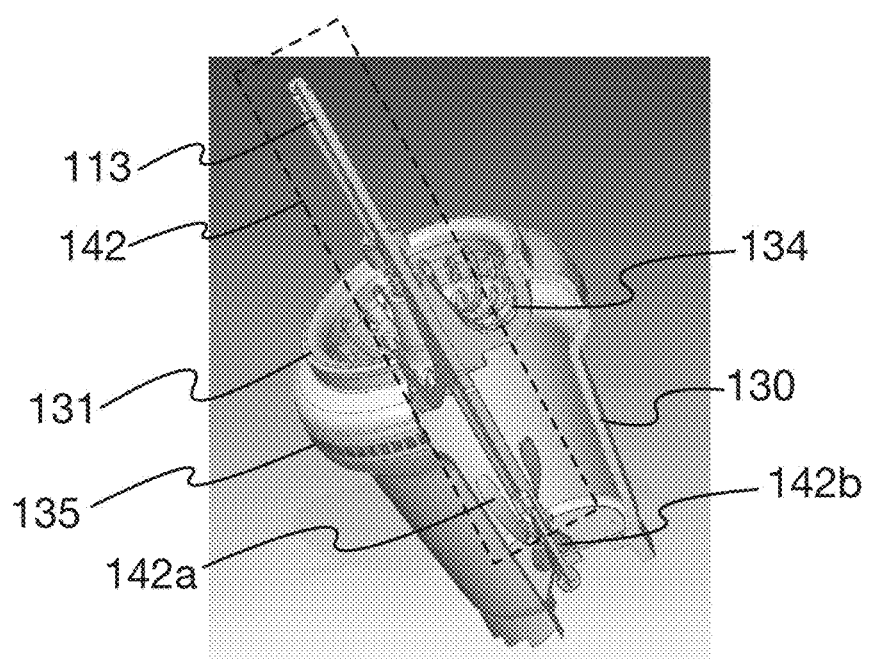
FIG. 16 is an illustration of a variation of the chamber, including an extraction aperture proximal the first portion of the chamber.
Figure 17:
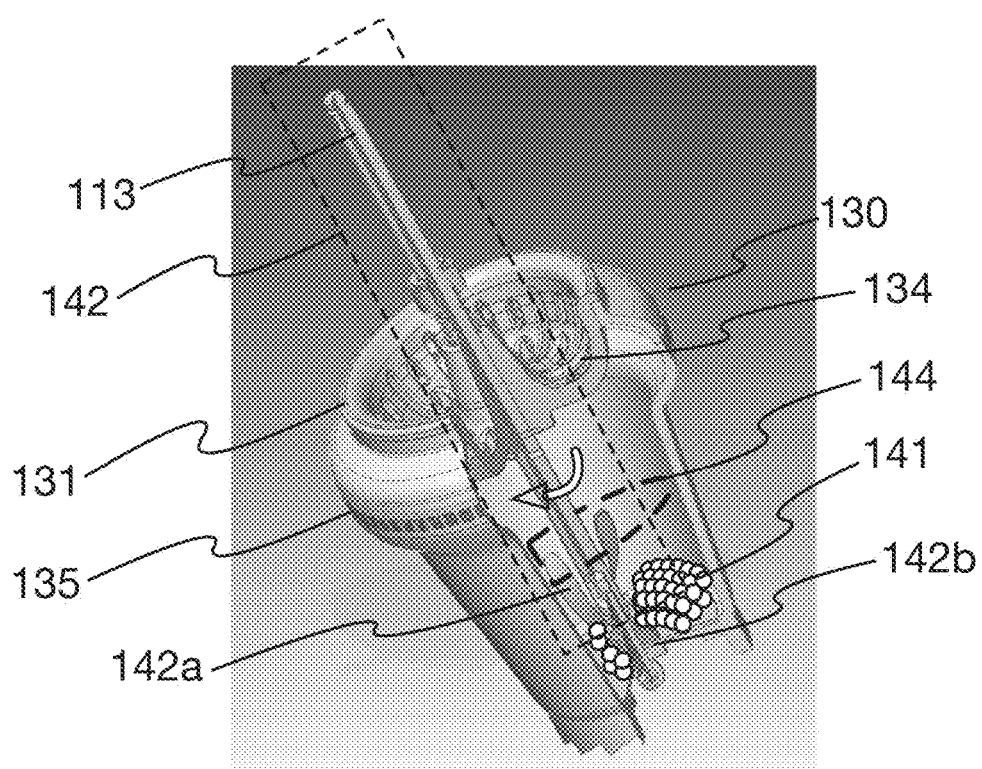
FIG. 17 is an illustration of a variation of the chamber, and indicates an example arrangement of the reducers in the chamber lumen during a first of several modes of operation of the system, as well as the agitation mechanism rotating while the chamber remains stationary.
Figure 18:
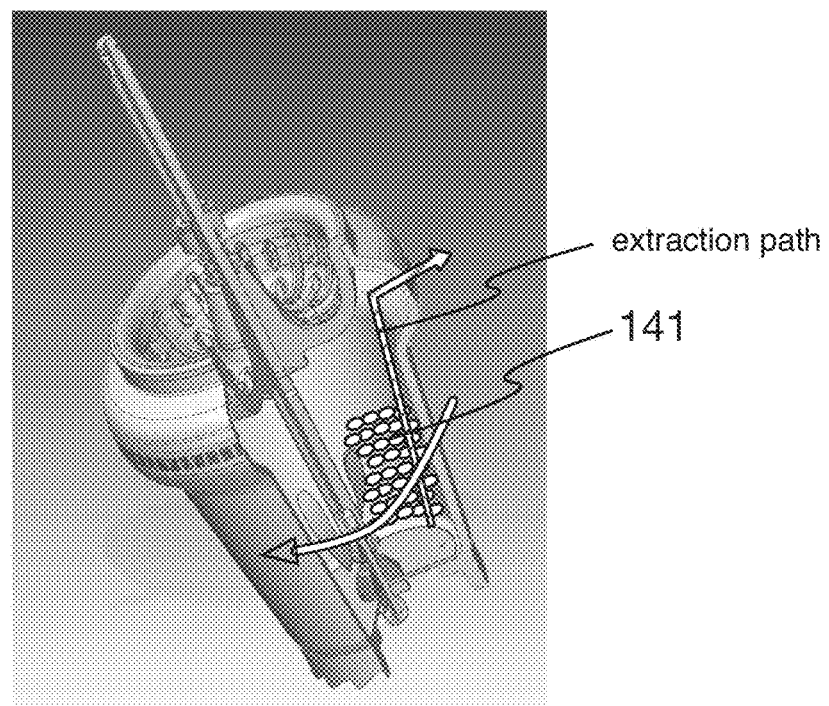
FIG. 18 is an illustration of a variation of the chamber, and indicates an example arrangement of the reducers in the chamber lumen during a second of several modes of operation of the system, as well as the chamber rotating with the agitation mechanism at the same angular velocity.
Figure 19:
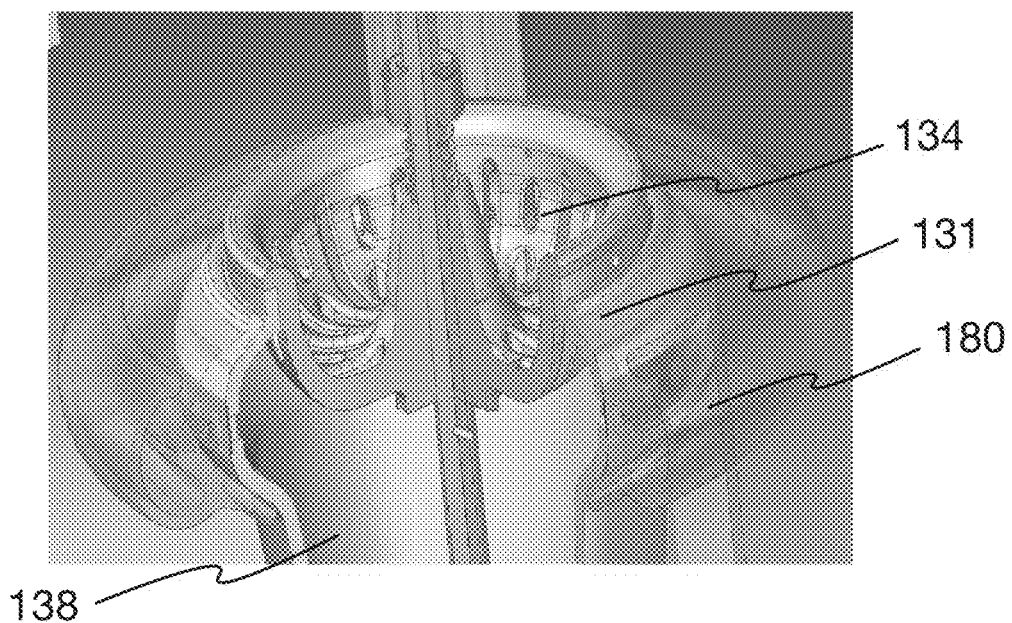
FIG. 19 is an illustration of a variation of the chamber, including a mold attached to the extraction aperture.

The first end 131 functions to define the material inlet 134 and a force application point, and can additionally function to substantially seal one end of the chamber. The first end 131 additionally or alternatively defines, or otherwise includes, one or more apertures for out-gassing of product volatiles (e.g., aromatics, water vapor, etc.). In some variations, the first end 131 can additionally function to support and/or retain the agitation mechanism 142, as shown in FIGS. 5, 16, and 17. The first end 131 is preferably arranged perpendicular to the chamber 130 longitudinal axis, but can alternatively be arranged in any other suitable position on the chamber 130. The first end 131 can be substantially flat, curved, grooved, or have any other suitable configuration. In a specific variation, the first end 131 includes a set of curved sides terminating in a tube or chimney, such that the first end lumen defines a portion of a toroid. The tube is preferably concentric with the first end 131, but can alternatively be offset from the first end 131 center or otherwise arranged. The tube can function to direct chocolate precursors toward the first end 131 bottom, defined between the central tube and curved sides; structurally support the agitation mechanism 142 and/or ingredient dispenser 120; prevent material buildup along the agitation mechanism 142 shaft; or be used in any other suitable manner. However, the first end 131 can be a segment of a sphere, a catenoid, a paraboloid of a revolution, a zone of a sphere or ellipsoid, a prism, or have any other suitable configuration. The apex of the first end 131 is preferably arranged proximal the chamber lumen 138 (e.g., convex, proximal the second end 132), but can alternatively be arranged distal the chamber lumen 138 (e.g., concave, distal the second end 132) or arranged in any other suitable configuration. In variants wherein the first end 131 supports the agitation mechanism 142, the agitation mechanism 142 preferably extends through the center of the first end 131, more preferably through the apex or central tube, but can alternatively extend through any other suitable portion of the first end 131. The first end 131 preferably includes a first broad face and a second broad face separated by a thickness. The first end 131 is preferably configured to couple to the chamber walls with the first broad face distal (e.g., external) the chamber interior and the second broad face proximal (e.g., within) the chamber interior, but can alternatively be arranged in any other suitable configuration. The first and/or second broad face can be substantially smooth, textured (e.g., include grooves, divots, protrusions, etc.), or have any other suitable feature.

The material inlet 134 functions to permit material flow into the chamber interior (chamber lumen 138). The material inlet 134 can additionally function to permit heated and/or cooled gas to flow into the chamber. The material inlet 134 can additionally function to permit effluent ingress and egress from the chamber lumen 138 after or during cleaning. The material inlet 134 can additionally permit volatile gas and evaporate egress from the chamber lumen 138 during the size reduction, conching, and/or tempering steps. The material inlet 134 is preferably defined through the thickness of the first end 131, but can alternatively be defined between the first end 131 and the chamber walls (e.g., as a gap, cooperatively defined, etc.), defined through the thickness of a chamber wall, or defined in any other suitable manner. The chamber 130 preferably includes multiple material inlets 134, but can alternatively include a single material inlet 134 or any other suitable number of material inlets 134. The material inlets 134 can be linear grooves, circles, polygons, or have any other suitable shape. The largest dimension of the material inlet profile is preferably smaller than the smallest dimension of the reducers 141 (e.g., the diameter of the material inlet 134 is preferably smaller than the reducer diameter), but can alternatively be smaller or larger. The material inlet 134 can additionally include a mesh, filter, or other size-selective component extending across the material inlet 134, wherein the through holes defined by the size-selective component is preferably smaller than the reducers 141. The size-selective component can be made from coated or uncoated metal, polymer, or any other suitable material. In a specific example, the material inlets 134 are 0.18" to 0.22" wide, with a length between 0.18" to 1.5". However, the material inlets 134 can have any other suitable set of dimensions. The material inlet 134 can have a rounded profile (e.g., the grooves can be ovular, the polygons can have rounded corners, etc.), an angular profile, or any other suitable profile. The transition between the first and/or second broad face and the material inlet 134 wall can additionally be curved, sloped, angled (e.g., meet the broad face at a right angle), or otherwise profiled. The material inlet 134 can be arranged along the bottom (e.g., nadir) of the first end 131, along the wall of the first end 131, from the wall to the bottom of the first end 131, or be arranged in any other suitable location and orientation. In a specific variation, the material inlets 134 extend radially outward from the center of the first end 131. The material inlets 134 are preferably substantially evenly distributed about the first end 131, but can alternatively be asymmetrically distributed or otherwise arranged. The material inlets 134 can be configured to avoid material clogging, and can have substantially similar profiles, different profiles (e.g., include both linear and circular inlets), or have any other suitable profile distribution.

Figure 4:
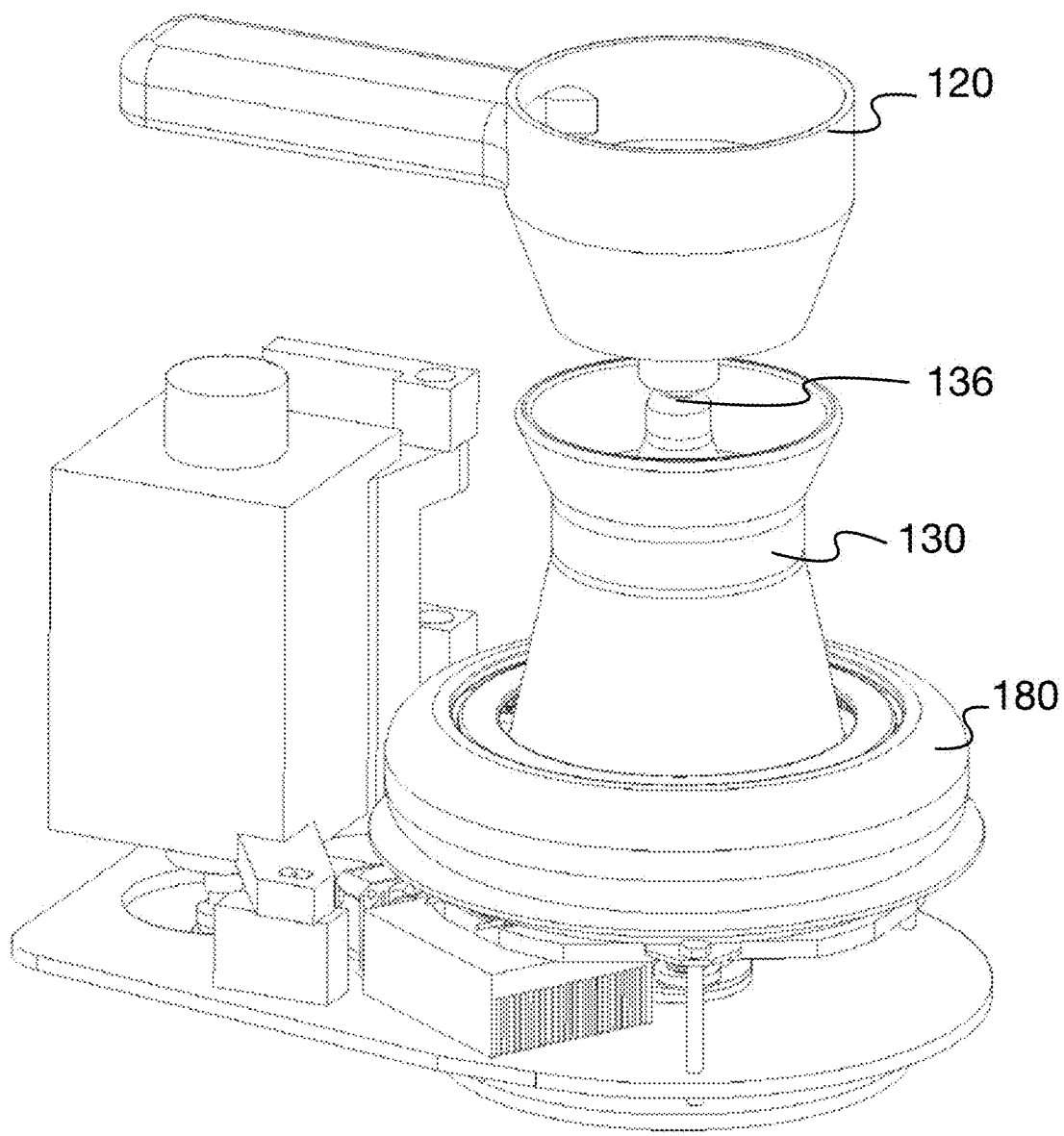
FIG. 4 is a perspective view of the internal components of a variation of the system, including a mold.

The force application point 136 functions to receive a coupling force, wherein the coupling force biases the first end 131 of the chamber 130 against the second end 132 of the chamber 130, thereby sealing the material outlet 135 of the chamber, and/or biases the chamber 130 toward the frame 160 to couple the chamber 130 with the drive mechanism. The force application point can receive a linear force, a rotational force, or any other suitable force. The force application point can additionally or alternatively function as an alignment mechanism or perform any other suitable functionality. The coupling force can be received from the ingredient dispenser 120 (e.g., generated by the ingredient dispenser 120 pressing downwards on the force application point 136 as shown in FIG. 4), from a user device, automatically applied by a force generation mechanism, or received from any other suitable source. The coupling force is preferably directed downward (e.g., toward the second end), but can alternatively be applied in any suitable direction. The force application point 136 is preferably a single point, but can alternatively be a set of points, a surface (e.g., a circular surface, a conical surface, a hemispherical surface, etc.), or any other suitable region at which force can be applied to the chamber 130. The force application point 136 is preferably arranged along the first end 131 of the chamber 130, but can alternatively be arranged in any other suitable location. In some variations, the force application point 136 can be a mating region in a male or female configuration, wherein the mating region dynamically interfaces with a complementary region of the ingredient dispenser 120. The force application point 136 is preferably located coaxially with the axis of rotation of the chamber 130, but can alternatively be located off-axis, circumferentially, or in any other suitable location defined by the first end 131 of the chamber.

The second end 132 of the chamber 130 functions to transiently or permanently seal an end of the chamber 130 (e.g., be a closed end), retain reducers 141, and/or retain the ingressed chocolate precursors within the chamber lumen 138 during one or more processing steps. In some variations, the second end 132 can additionally function to support and/or retain the agitation mechanism 142. In some variations, the second end 132 can additionally function to define the material inlet or material outlet (e.g., wherein chocolate can be extracted out the second end). The second end 132 is preferably formed as a unitary piece with the chamber walls, but can alternatively be formed as a separate piece and subsequently joined with the chamber walls, be removably coupled to the chamber walls, or otherwise coupled to the chamber walls. The second end 132 is preferably arranged perpendicular a chamber longitudinal axis, but can alternatively be arranged in any other suitable position on the chamber 130. The second end 132 preferably opposes the first end 131 along the length of the chamber 130, but can alternatively be arranged in any other suitable position. The second end 132 can be substantially flat, curved, profiled (e.g., pitched, conical, etc.), or have any other suitable configuration. In one variation, the second end 132 includes an apex, wherein the apex of the second end 132 cooperatively defines and is arranged within the chamber lumen 138 (e.g., proximal the first end 131). In a second variation, the apex of the second end 132 is distal the chamber lumen 138 (e.g., distal the first end 131). The apex can be concentric with the second end 132, offset from the second end 132 central axis, or otherwise arranged. In variants wherein the second end 132 supports the agitation mechanism 142, the agitation mechanism 142 preferably extends through the center of the second end 132, more preferably through the apex but alternatively through any other suitable portion of the second end 132. The second end 132 can be larger than the first end 131, be smaller, or be substantially the same. In one example, the second end 132 is between 3.5" to 3.86" in diameter, but can alternatively be between 3" to 6" or have any other suitable dimension. The second end 132 dimensions can be determined based on the batch size, wherein the diameter is selected such that the chocolate precursors of the batch substantially cover the active end of the agitation mechanism 142 (e.g., the blades 142*a* of the agitation mechanism 142) when the agitation mechanism 142 is substantially static relative to the chamber 130 and creates a wave shaped flow pattern during chocolate precursor size reduction, which can function to help cool and/or aerate the chocolate mass. However, the diameter can be otherwise selected.

The chamber walls function to retain chocolate precursors within the chamber lumen 138. The chamber walls can additionally or alternatively function as a force generation surface (e.g., as an impact surface, shear force generation surface, etc.), a temperature control surface, a guide for chocolate extraction from the chamber lumen 138, as a selective material outlet 135 seal, to define the material outlet 135, or be used in any other suitable manner. The chamber walls can be substantially flat, cooperatively define an arcuate groove (e.g., form a toroid) along all or a portion of the wall length, or have any other suitable configuration. The chamber walls preferably extend at a non-normal (e.g., oblique) angle from the second end 132, more preferably at an obtuse angle from the second end 132, but can alternatively extend at a normal angle from the second end 132, at an acute angle from the second end 132, or extend from the second end 132 at any suitable angle. For example, the inner chamber diameter can gradually increase from the second end 132 to the material outlet 135 (e.g., to permit fluid flow induced by centrifugal force during extraction). In a specific example, the angle between the second end normal vector and the chamber walls can be between 8.5° and 9.5°, between 5° and 50°, or be any other suitable angle. The interface between the second end 132 and the chamber walls can be angled (e.g., a right angle, obtuse angle, etc.), curved (e.g., concave toward the chamber interior, convex toward the chamber interior), ogeed (e.g., S-shaped, double-continuous S-shaped, etc.), or have any other suitable profile. In one example, the concave interface has a radius substantially half of the smallest reducers 141 (e.g., 0.16" when 5/16" diameter reducers 141 are used). However, the interface radius can be substantially the same size as the reducers 141, larger than the reducers 141, or have any other suitable radius. The chamber walls are preferably substantially straight, but can alternatively curve along their length (e.g., to define an arcuate bulge or indent) or have any other suitable configuration. The chamber walls can be 5.5" long (e.g., such that the chamber 130 is 5.5" tall or shorter), but can alternatively be between 4.5" and 8" long, or have any other suitable length. The chamber wall length (e.g., chamber height) can be determined based on the desired batch size, wherein the length is selected to maintain a predetermined separation distance between the material outlet 135 and the top of the chocolate precursor wave formed during size reduction. However, the chamber wall dimensions can be otherwise selected.

The material outlet 135 (extraction aperture 135) of the chamber 130 functions to permit chocolate extraction from the chamber lumen 138 upon application of an egress force. The material outlet 135 can additionally or alternatively permit volatile gas and evaporate egress from the chamber lumen 138 during the size reduction, conching, and/or tempering steps (e.g., passive or active, such as application of an egress force). The egress force can be centrifugal force (e.g., generated by rotating the chamber), positive pressure (e.g., pressurizing the chamber lumen), negative pressure (e.g., pulling a vacuum), or any other suitable force. The material outlet 135 can be defined between the first end 131 and the chamber walls, through the chamber wall thickness, defined thorough a portion of the first end 131, defined along the center of the chamber 130 (e.g., radially or laterally), defined between the second end 132 and the chamber walls, defined along a portion of the chamber length (e.g., proximal the first end 131, proximal the second end 132, centered between the first end 131 and second end 132, etc.), or defined in any other suitable manner. The system 100 can include multiple material outlets 135, a single material outlet 135, or any suitable number of material outlets 135. The material outlet 135 can additionally or alternatively include an array of apertures, include a mesh, include a filter, or include any other suitable filtering component that functions to filter and/or better distribute the liquid chocolate flowing out the material outlet 135. The material outlet 135 (or portions of the material outlet 135, such as a filter 151) can be actively or passively heated to inhibit solidification of material (e.g., chocolate) as it is extracted. The material outlet 135 can be made from the same material as the chamber 130, the material inlet 134, or made from any other suitable material.

The material outlets 135 can be slots, circles, or have any other suitable profile or cross section. The material outlets 135 can be magnetic or non-magnetic. The material outlets 135 are preferably defined along an arcuate portion of the chamber 130, but can alternatively be defined along a length of the chamber 130 or along any other suitable portion of the chamber 130. The minor dimension of the material outlets 135 are preferably smaller than the reducer dimension, but can alternatively be larger. In one example, the material outlet 135 can be a slot with a minor dimension of less than 0.22". The material outlet 135 can be static or actuate between a set of modes (e.g., open and closed). Material outlet actuation is preferably passive, but can alternatively be active (e.g., actively controlled, such as by an active valve 152). The material outlet 135 is preferably passively biased open, wherein application of a coupling force closes the material outlet 135, but can alternatively be passively biased closed, wherein application of a coupling force opens the material outlet 135. However, the material outlet 135 can be otherwise configured and/or operated.

In a first variation, the material outlet 135 is passive and is defined along an arcuate portion of the chamber 130, proximal the first end 131 and distal the second end 132. In a second variation, the material outlet 135 is active and defined along portion of the chamber 130 proximal the second end 132. In this variation, the material outlet 135 includes an active valve 152 that selectively permits and prevents fluid connection between the chamber lumen 138 and an external component (e.g., a pump). In a third variation, an actuatable material outlet 135 is defined between the first end 131 and the second end 132 of the chamber 130. The first end 131 and the second end 132 are preferably separable along the longitudinal axis of the chamber 130, but can alternatively be arcuately separable, radially separable, or otherwise separable. The first end 131 and second end 132 of the chamber 130 can be operable between a closed mode, wherein the first end 131 is sealed against the second end 132, and an open mode, wherein the first end 131 is distal the second end 132. However, the first end 131 and second end 132 can be statically retained relative to each other, or otherwise configured. When the first end 131 and second end 132 are actuatable between one or more modes, the first end 131 and second end 132 of the chamber 130 can be actively retained against one another (e.g., with a spring 154, linear actuator 173, latch 153, lock, etc.), passively retained against one another, actively biased apart from one another (e.g., by a motor, etc.), passively biased apart from one another (by a spring 154, magnets, etc.), or otherwise retained.

In one example, the material outlet 135 is biased open by a biasing mechanism (e.g., a spring 154) that separates the first end 131 and second end 132 of the chamber 130 by a finite distance in the absence of the coupling force. Application of the coupling force to the chamber (e.g., to the force application point 136) translates the first end 131 along the rotational axis toward the second end 132 to seal the material outlet 135. Additionally or alternatively, the first end 131 and second end 132 of the chamber 130 can be adjacent (e.g., resting against one another) in the absence of the coupling force (e.g., received and transmitted by the force application point 136), and hermetically seal against one another when the coupling force is applied to the force application point 136.

In a specific example, the ingredient dispenser 120 is pushed against the force application point 136 of the first end 131 of the chamber 130, sealing and closing the material outlet 135 formed by the interface between the first end 131 and second end 132 and engaging a latch 153 that holds the first end 131 and second end 132 in a sealed configuration. In this specific example, the latch 153 disengages when the system 100 is operated in the extraction mode, unsealing and opening the material outlet 135. In some variants, a spring 154 biases the first end 131 and second end 132 of the chamber 130 apart from one another in the absence of the downward force applied by the ingredient dispenser 120 against the chamber 130. However, the material outlet 135 and the first end 131 and second end 132 of the chamber 130 can be otherwise configured.

The chamber 130 is preferably actuatable, but can alternatively be statically mounted to the frame 160 or otherwise coupled to the remainder of the system. Chamber 130 actuation can include: Chamber rotation about a rotational axis, individual chamber portion rotation about the rotational axis, individual chamber 130 portion linear actuation along the rotational axis, chamber 130 linear actuation along the rotational axis, chamber 130 or chamber 130 portion linear actuation at an angle to the rotational axis, or be actuated in any other suitable manner. Chamber 130 actuation is preferably dependent on the system 100 operation mode, but can alternatively be controlled and/or selected based on an input (e.g., a user input, control input, etc.) or be selected in any other suitable manner. For example, the chamber 130 can be statically retained in the grinding, refining, and tempering modes; linearly actuated into the extraction mode; and rotationally actuated in the extraction mode.

Linear chamber actuation can function to open and close the material outlet 135, to couple and decouple the chamber 130 from the hopper, to couple and decouple the chamber 130 from the drive mechanism 110, or perform any other suitable functionality. The chamber 130 can be linearly actuated by a linear actuator 173 (e.g., screw actuator, cam, wheel and axle, etc.), the drive mechanism 110, a secondary drive mechanism 110, a spring 154 mechanism, a magnetic mechanism, an applied force (e.g., applied by a user), or by any other suitable linear actuation mechanism.

Chamber rotation can function to apply a centrifugal force on products (ingredients, materials, reducers 141) within the chamber 130 and push the products towards and/or egress the products from the material outlet 135. Alternatively, product egress from the chamber interior can be effected by a pump (e.g., positive displacement pump, reciprocating pump, pneumatic pump, etc.), a gravity drain (e.g., wherein the chocolate flows out an aperture arranged at the bottom of the chamber 130 or in the second end 132, relative to a gravity vector), or by any other suitable extraction mechanism 150 connected to the chamber 130. However, chamber rotation can perform any other suitable functionality (e.g., clean the chamber interior, etc.). The chamber 130 can be rotated by the drive mechanism 110, a secondary drive mechanism 110, or by any other suitable rotary mechanism.

In a specific variation, the chamber 130 defines a rotation axis, and includes a first end 131 and second end 132 that cooperatively define a chamber lumen 138. The first end 131 and second end 132 of the chamber 130 are actuatably separable at a seam (e.g., by a spring 154, lever, linear actuator 173, solenoid, or any other suitable actuator), wherein the seam intersects an extraction plane. The extraction plane is preferably normal to the rotation axis, but can alternatively be arranged obliquely, parallel, or in any other suitable orientation relative to the rotation axis. In this variation, the chamber 130 preferably includes a precursor inlet (e.g., material inlet 134), but can additionally or alternatively include an array of precursor inlets, a hopper containing multiple types of ingredients, an internal ingredient-storage container, or any other suitable mechanism for dispensing materials into the chamber 130 for processing.

In another specific variation, the chamber 130 has proportions defined by a total chamber height of 6.75", a height of the top section (first end 131 of the chamber 130) of 3.5", a height of the bottom section (second end 132 of the chamber 130) of 0.75", and a height of the material inlet 134 portion of 2.5". The maximum internal diameter of the chamber 130 is 5", and the maximum extent of the blades 142a from the processing shaft 113 is to a diameter of 2.6". The chamber 130 is mounted to a base plate 172b with a diameter of 3.25", and the base plate 172b is connected to the rotary drive mechanism 110a by a drive belt 112a.

Figure 7:
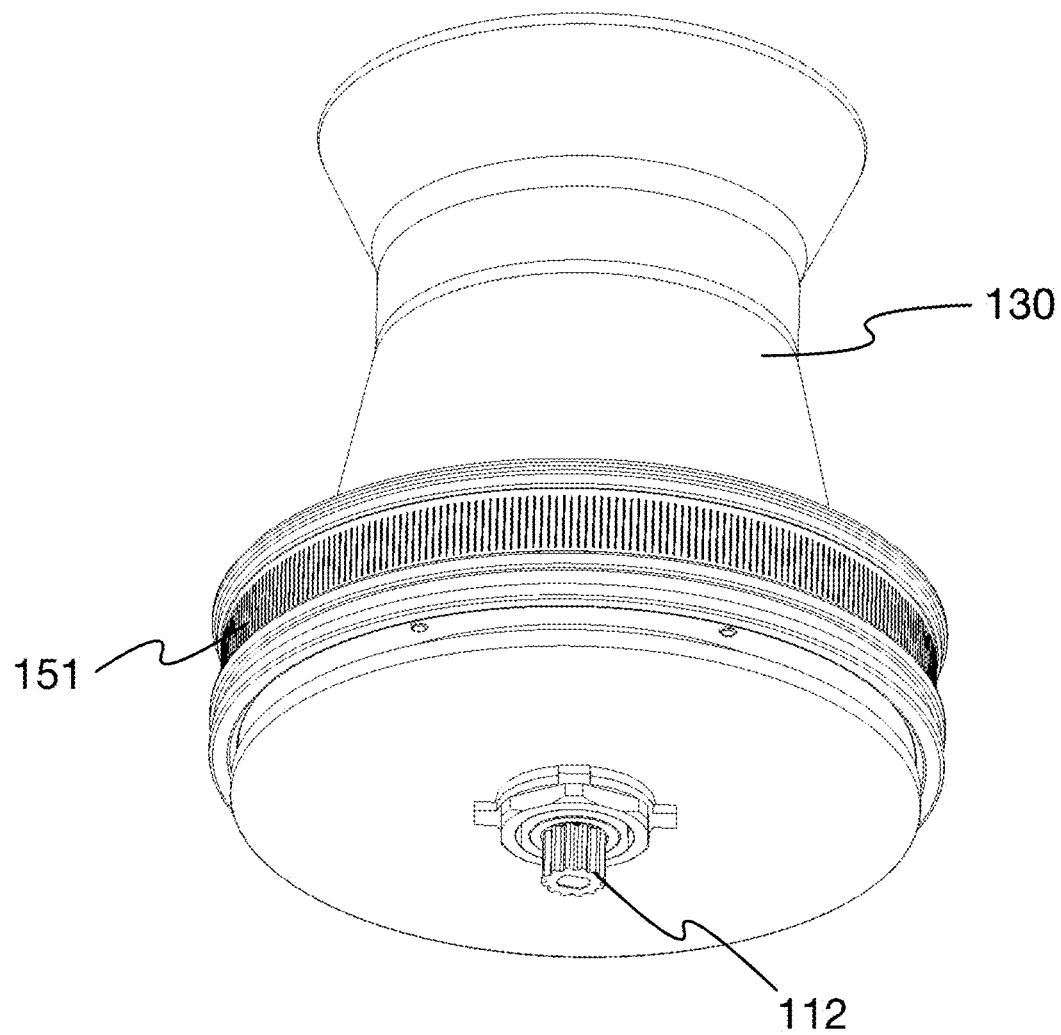
FIG. 7 is a perspective view of a variation of the chamber including a filter and also depicts a portion of the power transfer mechanism.
Figure 8:
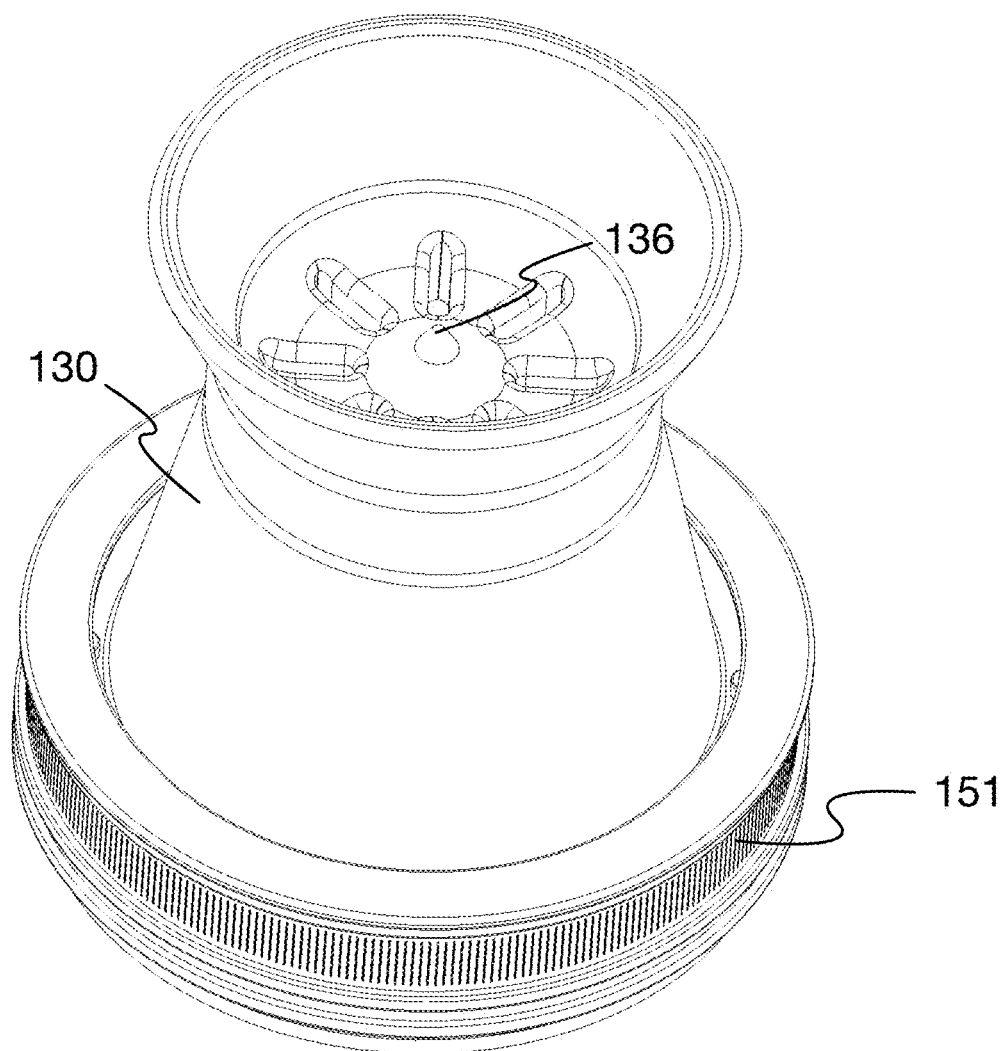
FIG. 8 is a perspective view of a variation of the chamber, and depicts a force application point.

The system 100 can additionally include one or more filtering mechanisms arranged in an array, in layers, or in any other suitable configuration. The filtering mechanism (e.g., filter 151) can be arranged circumferentially around the material outlet 135, as shown in FIGS. 5, 7 and 8. The filtering mechanisms can be transiently or permanently coupled to the chamber 130, otherwise coupled to the chamber 130, transiently or permanently coupled to the mold, or otherwise interposed between the chamber lumen and the mold lumen. For example, the mesh diameter can be 0.006" by 0.006", 0.015" by 0.015," 0.006" by 0.015," or have any other suitable dimension. Alternatively, the material outlet 135 can be substantially unobstructed.

1.5 Size Reduction Mechanism

The size reduction mechanism 140 of the system 100 functions to reduce the size of the chocolate precursors (e.g., ingredients, materials, additives). The size reduction mechanism 140 can reduce the chocolate precursor size to a substantially homogeneous particle size (e.g., between 0.5 to 75 microns, between 15-25 microns, etc.), to a substantially uniform particle size distribution, below a predetermined particle size threshold, or reduce the precursor particulate size in any other suitable manner. The size reduction mechanism 140 can additionally function to mix the chocolate precursors to achieve a substantially isotropic mixture, but can alternatively form a substantially anisotropic mixture or any other suitable mixture. The size reduction mechanism 140 is preferably mechanically coupled to the drive mechanism 110, and translates the force generated by the drive mechanism 110 into a reducing force (e.g., a pulverizing force, grinding force, etc.), but can alternatively be driven by any other suitable source of force. The size reduction mechanism 140 can be a ball mill, impact mill (e.g., including small pins or hammers that drive the chocolate precursors against an impact surface), disc mill (e.g., wherein rotating discs shear particulates entrained therebetween), burr grinder (e.g., wherein particulates are ground between one or more rough surface), roll refiner (e.g., wherein multiple cylindrical rollers entrain and compress solid particulates therebetween), corundum disc mill, wet grinder, planetary ball grinder, magnetic mixer, reducer agitation mechanism 142 (e.g., wherein a chamber 130 containing a plurality of reducers 141 is agitated to agitate the reducers 141), or any other suitable size reduction mechanism 140.

In one variation, the size reduction mechanism 140 includes a ball mill, wherein the ball mill includes a set of reducers 141 (e.g., balls 141a, obliods, etc.), an agitation mechanism 142, and an impact surface. However, the size reduction mechanism 140 can include any other suitable component. In a specific example of this variation, the total volume occupied by the plurality of balls 141a within the chamber 130 is 400 cubic centimeters, with the balls 141a arranged in a close-packed configuration. In variations including a set of balls 141a, the set of balls 141a can alternatively occupy any suitable volume of the chamber 130.

Figure 10:
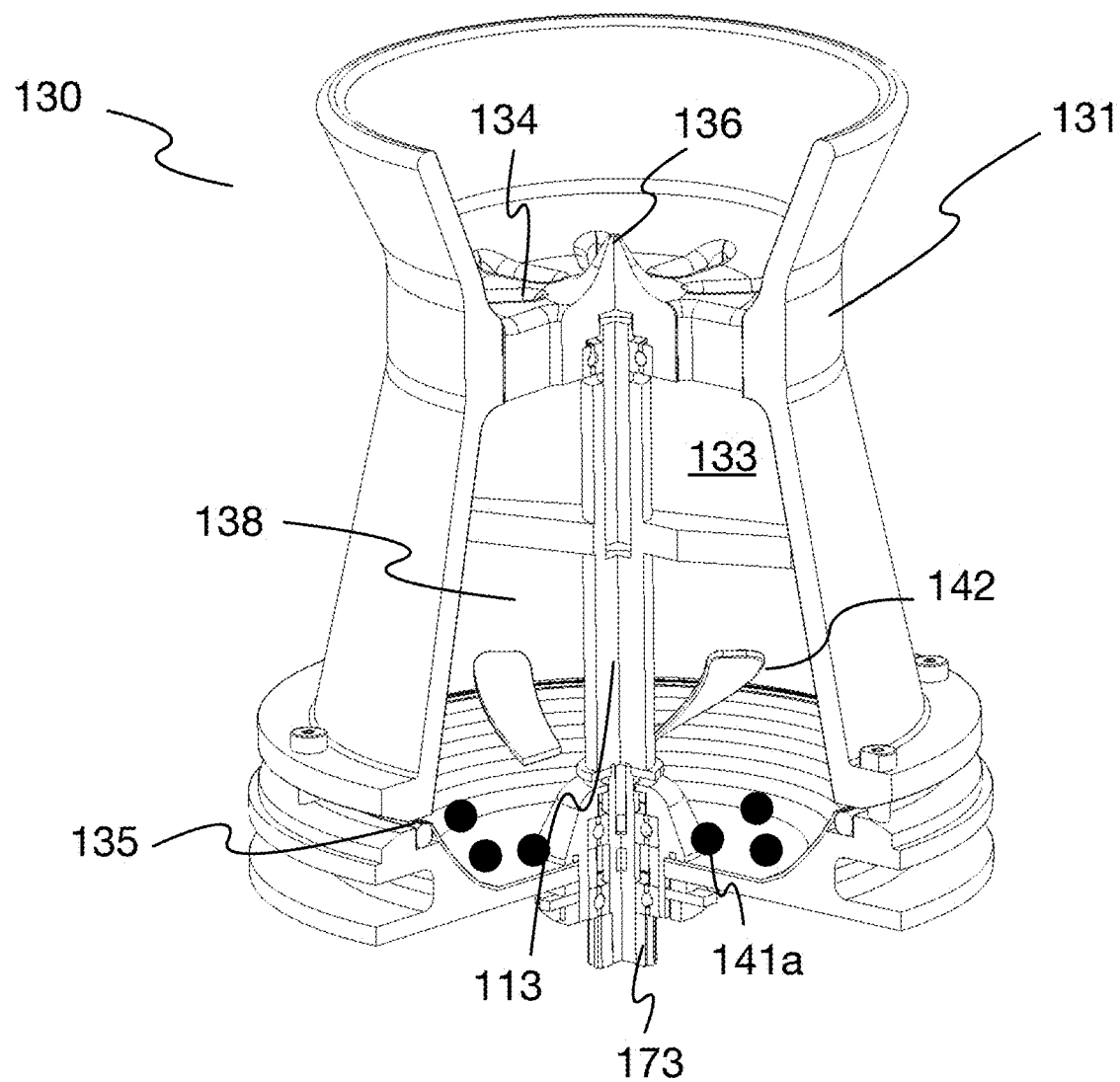
FIG. 10 is a cutaway view of a variation of the chamber and internal components, including the processing shaft, the agitation mechanism, the size reduction mechanism, and the chamber lumen. A portion of the linear actuator is also depicted.
Figure 11:
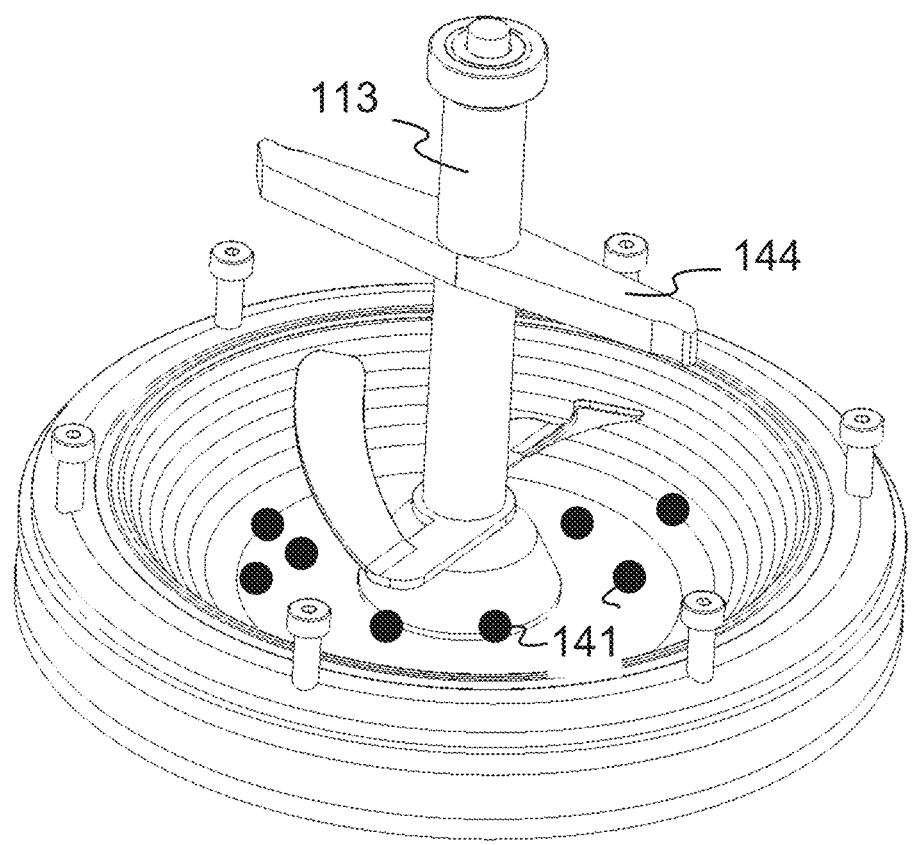
FIG. 11 is a perspective view of several internal components of a variation of the chamber, including the processing shaft, reducers, and the wiper.

The reducers 141 of the size reduction mechanism 140 function to reduce the size of the chocolate precursors. In particular, the reducers 141 can function to entrain particulates between adjacent reducer units (e.g., adjacent balls 141a) or between a reducer unit and an impact surface (e.g. blades 142a and/or interior surface 133); translate linear force imparted by the agitation mechanism 142 on the reducer 141 to a pulverizing force (e.g., normal, angled, or shear force when the reducer 141 is driven against the impact surface) or grinding force (e.g., when a first and second reducer 141 translate relative to each other); or reduce the precursor particulate size in any other suitable manner. In a first variation, the reducers 141 are translated within the chamber lumen by blades rotating within the mass of reducers. In a second variation, the reducers 141 are translated within the chamber 130 by an applied electromagnetic field (e.g., a rotating magnetic field). However, the reducers 141 can be translated upon application of any other suitable driving force. The reducers 141 (and/or balls 141a) are preferably arranged within the chamber 130 (e.g., arranged at the base of the chamber lumen 138), as shown in FIGS. 10 and 11, but can alternatively be arranged outside of the chamber 130 or at any other suitable location. The reducers 141 can additionally function to filter egressing chocolate (e.g., wherein the reducers 141 automatically assemble into a matrix or array along the chamber walls when the chamber 130 is spun (as shown in FIGS. 18, 20, and 21E-F), such that the chocolate traverses a tortuous path through the stacked reducers 141 to the material outlet 135), or be used in any other suitable manner. The reducers 141 can additionally function as an abrading or cleaning agent during the cleaning process. The reducers 141 can additionally function to generate heat (e.g., when in motion), wherein the resultant heat can heat the chocolate mass to facilitate tempering, conching (e.g., by driving off volatiles), or facilitate any other suitable process. The motion of the reducers 141 can additionally function to substantially uniformly coat the particulates with fat or any other suitable coating agent. The motion of the reducers 141 can additionally function to substantially shape the particle profile (e.g., grind the particles such that they are substantially spherical), or perform any other suitable functionality. The reducers 141 are preferably arranged within the chamber lumen 138, and can be substantially permanently sealed within the chamber lumen 138 (e.g., cannot be removed without destroying the chamber lumen 138) or be removably sealed within the chamber lumen 138.

The system 100 preferably includes a plurality of reducers 141, but can alternatively include a single reducer unit. In one variation, the reducer volume can be a predetermined proportion of the chamber lumen volume (e.g., ⅓ of the chamber lumen volume, ¼ of the chamber lumen volume, ½ of the chamber lumen volume, etc.). In a second variation, the reducer 141 mass can be a predetermined proportion of the desired chocolate precursor mass and/or volume (e.g., 760% of the ingredient mass, 1,000% of the ingredient mass, 150% of the ingredient mass, 50% of the ingredient mass, etc.). In a third variation, the reducer volume can be a predetermined volume (e.g., 400 cubic centimeters). However, the number of reducers 141 included within each system can be determined in any other suitable manner. The number of reducers 141 within the chamber lumen 138 can remain substantially static, wherein each system is configured for a specific batch mass or batch size, or be variable, wherein reducer units can be added or removed based on the batch size. The number of reducers 141 within the chamber lumen 138 can be manually adjusted, automatically adjusted, or otherwise adjusted. In one example of automatic reducer adjustment, the frame 160 or other system component dynamically adjusts the number of reducer units within the chamber lumen 138 based on the actual or anticipated batch parameters, such as the volume, mass, recipe, or other parameter. In a second example of reducer adjustment, the reducers 141 for the batch can be retained within the ingredient package, such that the reducers 141 are added with the precursors through the material inlet 134 and removed with the chocolate product through the material outlet 135. In a second example of reducer adjustment, a user can add or remove reducers 141 through the material inlet 134, material outlet 135, or a separate aperture in the chamber.

The reducer 141 is preferably spherical, but can alternatively be cylindrical, polygonal, ellipsoid, eclipsoid (e.g., a sphere with opposing flat ends), obliod, or have any other suitable form factor. The reducer shape can be selected based on the surface area to mass ratio, surface area to volume ratio, or based on any other suitable parameter. The reducers 141 can all be substantially the same size and shape (e.g., be a homogeneous distribution), be a mix of different sizes or shapes (e.g., be a heterogeneous distribution), or have any other suitable distribution. The reducer size is preferably selected based on the desired particulate size of the chocolate precursors after size reduction, but can be otherwise selected. In one variation, the reducer diameter is 5/16", but can alternatively be between 0.2" to 0.5", or be any other suitable size. Each reducer unit can be made from metal (e.g., stainless steel in the 300 series, such as stainless steel 304), polymer, ceramic, or any other suitable material. The reducers 141 of the population can include reducer units of a single material type or multiple material types. The reducers 141 can be ferrous (e.g., magnetic), nonferrous, or have any other suitable electromagnetic property. In one variation, the system can include a reducer retention mechanism that retains the reducers within the chamber lumen and/or keeps the reducers in a cohesive mass. Examples of the reducer retention mechanism include the filtering mechanism, a mesh over the material outlet, ferrous reducers, or any other suitable mechanism capable of retaining the reducers within the chamber lumen or maintaining the reducers as a cohesive mass.

Figure 6:
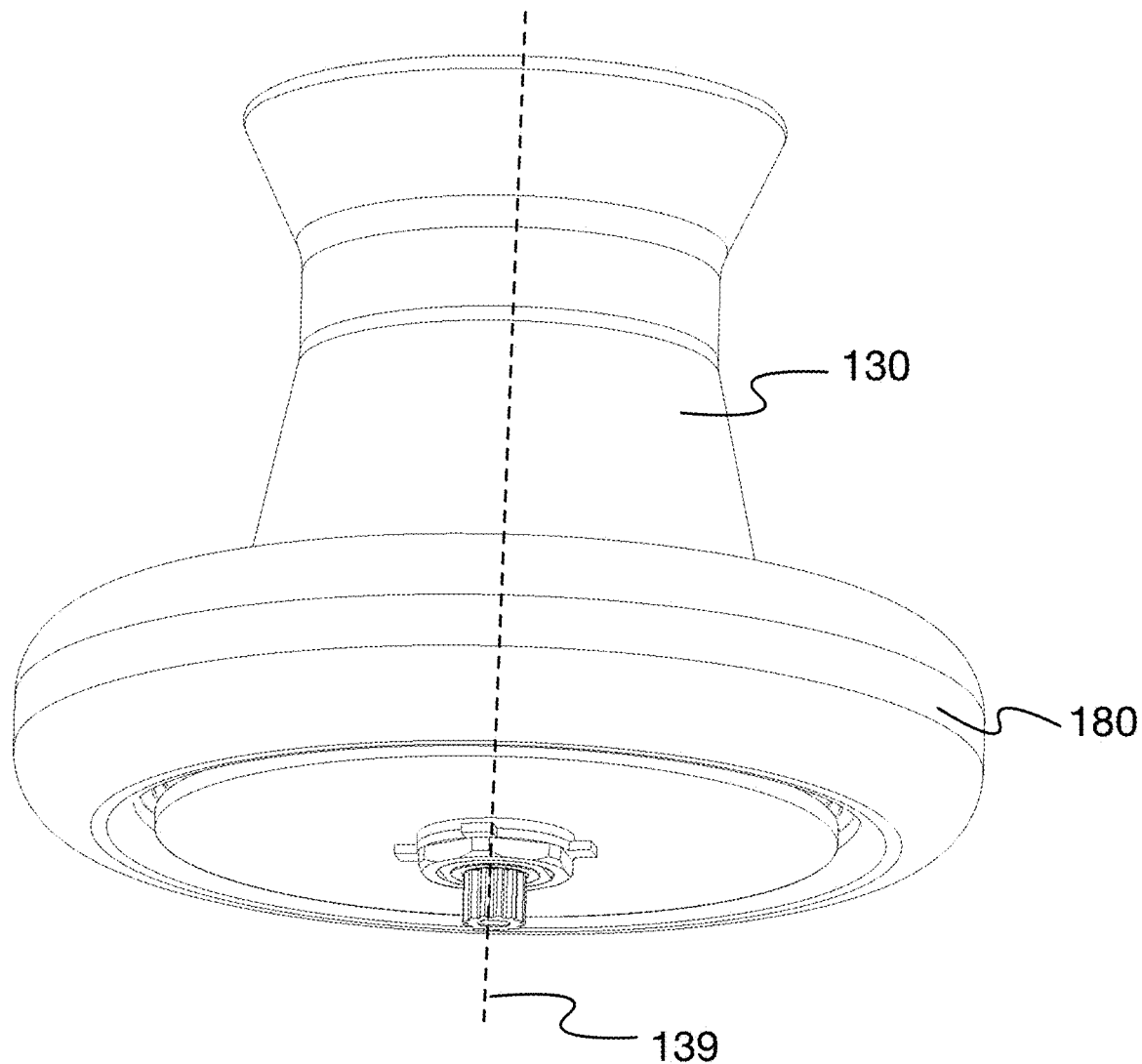
FIG. 6 is a perspective view of a variation of the chamber, and depicts a mold arranged around the circumference of a portion of the chamber.

The agitation mechanism 142 of the size reduction mechanism 140 functions to mechanically couple to the drive mechanism 110 and to transfer the generated force to the reducers 141. The agitation mechanism 142 can additionally or alternatively agitate the chocolate precursors. The agitation mechanism 142 preferably includes a shaft and a set of blades 142a, but can alternatively include any other suitable component. In variations, the set of blades 142a preferably extends helically outward from the shaft, but can alternatively extend from the shaft in any suitable configuration. The agitation mechanism 142 is preferably rotationally coupled to the chamber 130 (e.g., wherein the agitation mechanism 142 rotates relative to the chamber 130), but can additionally or alternatively be actuatably coupled to the chamber 130 (e.g., wherein the agitation mechanism 142 can linearly actuate along an axis substantially parallel the chamber longitudinal axis 139, an example of which is shown in FIG. 6, linearly actuate along a radius extending from the chamber longitudinal axis, etc.), statically coupled to the chamber 130, or be otherwise coupled to the chamber 130. The agitation mechanism 142 can be operable between a set of modes (e.g., rotatably coupled to the chamber 130, statically coupled to the chamber 130, etc.), wherein the agitation mechanism 142 can be selectively operated in each mode based on the system 100 operation mode. All or a portion of the agitation mechanism 142 can be enclosed within the chamber 130. In one variation, a portion of the shaft and all the blades 142a of the system 100 are substantially permanently enclosed within the chamber 130. In a second variation, all of the shaft and the blades 142a are substantially permanently enclosed within the chamber 130. In a third variation, all or a portion of the shaft and all of the blades 142a are removably enclosed within the chamber 130. However, the agitation mechanism 142 can be otherwise configured relative to the chamber 130.

The shaft of the agitation mechanism 142 functions to mechanically couple to and create relative motion between the blades 142a and the chamber 130. In one variation, the shaft transfers force from the drive mechanism 110 to the blades 142a. In a second variation, the shaft statically retains the blades 142a while the drive mechanism 110 translates the chamber 130. However, the shaft can otherwise create relative motion between the chamber 130 and the blades 142a. The shaft preferably extends along all or a portion of the chamber length, but can alternatively extend along any other suitable portion of the chamber 130. The shaft preferably extends through one or more ends of the chamber 130, wherein the interface between the shaft and the end (e.g., second end 132 or first end 131) can include bearings or any other suitable rotational interface. In a first variation, the shaft extends through the first end 131 of the chamber 130 toward the second end 132, wherein the chamber 130 is configured to couple to the drive mechanism 110 with the first end 131 proximal the drive mechanism 110. In a second variation, the shaft extends through the second end 132 of the chamber 130 toward the first end 131, wherein the chamber 130 is configured to couple to the drive mechanism 110 with the second end 132 proximal the drive mechanism 110. However, the shaft can otherwise interface with the chamber 130. The agitation mechanism 142 can include one or more shafts.

The blades 142a of the agitation mechanism 142 function to translate a drive force into a force that is imparted upon the reducers 141. The drive force can be received from the shaft, from an external electromagnetic field (e.g., rotating field, periodically changing field, etc.), or from any other suitable source. The blades 142a are preferably curved (e.g., helical), but can alternatively be substantially flat, twisted, or have any other suitable profile. The blades 142a can be coupled normal to the shaft rotational axis (longitudinal axis), parallel to the rotational axis, or coupled in any other suitable configuration. In one variation, the blade bases are coupled to the shaft normal the rotational axis, wherein the blade twists about the blade longitudinal axis with distance from the shaft, such that the blade tip is arranged at a predetermined angle (e.g., 40°, 90°, etc.) relative to the blade base. However, the blades 142a can be otherwise configured. The blades 142a are preferably rounded (e.g., propeller-like), but can alternatively be substantially polygonal, crescent-shaped, or have any other suitable profile. The broad faces of the blades 142a are preferably substantially smooth, but can alternatively include surface features, such as grooves extending parallel the longitudinal or lateral axis of the blade, protrusions, divots, or any other suitable surface feature. The agitation mechanism 142 preferably includes an even number of blades 142a, but can alternatively include an odd number of blades 142a. In one variation, the agitation mechanism 142 includes two blades 142a. The blades 142a are preferably substantially evenly angularly distributed about the rotational axis of the shaft, but can alternatively be unevenly angularly distributed. The blades 142a can be arranged on a single level (e.g., be arranged such that they share a common plane normal to the rotational axis), multiple levels, in a spiral pattern along the shaft length, or be otherwise distributed about the shaft length. The blade-shaft junction (e.g., in an arcuate direction about the shaft) can be angled, smooth (e.g., curved), or otherwise profiled. The blade dimensions are preferably selected based on the interior chamber 130 dimensions, but can additionally or alternatively be determined based on the reducer size, power required to drive blade rotation, or determined in any other suitable manner. In one example, the blade length can be a percentage of the chamber 130 diameter (e.g., half or more than half the maximum chamber 130 diameter). In a specific example, the blade length can be 2.6 inches, and the widest diameter of the chamber 130 is 5 inches. However, the blade 142a can be otherwise dimensioned.

The blades 142a can be made of a single material, multiple materials, or have any other suitable material composition. The blades 142a can be made of or coated in a hydrophobic or oleophobic material, but can alternatively be made of or coated in a hydrophilic or oleophilic material. The blades 142a can be magnetic to attract or repel the reducers 141 or metallic components (e.g., include a permanent magnet, electromagnet, etc.), non-magnetic, or have any other suitable electromagnetic parameter. The blades 142a of the set can be substantially similar or different in material, shape, or any other suitable parameter.

The blade arrangement within the chamber 130 is preferably determined based on the reducer size, but can alternatively be determined in any other suitable manner. The blade clearance between adjacent components (e.g., the second end 132, chamber wall, etc.) is preferably selected to minimize reducer 141 seizure between the component and blade edge, but can alternatively be selected in any other suitable manner. In one example, the distance between the blade tip and the chamber wall is between 2-3 reducer diameters (e.g., 2.1 ball diameters). In a second example, the distance between the blade edge and the second end 132 of the chamber 130 is between 2.1-2.8 reducer diameters (e.g., 2.46 ball diameters). However, the distance between the blade 142a and chamber 130 component can be half the reducer diameter, less than one reducer diameter, more than one reducer diameter, one reducer diameter, or be any other suitable distance.

The agitation mechanism 142 can additionally include a set of interfaces 142b that function to prevent material buildup at the interface between each blade 142a and the processing shaft 113. The interfaces can additionally function to prevent material buildup between the processing shaft 113 and the chamber 130, such as when the processing shaft 113 extends through the second end 132 of the chamber 130. The interfaces can function to eliminate any sharp transitions between the blade 142a and the processing shaft 113 in a direction substantially parallel to the rotational axis. FIG. 16 depicts an example of the set of interfaces 142b. The interfaces can be caps, standoffs, or any other suitable component. The interfaces can be convex, concave, flat, or have any other suitable profile. The interfaces can be conical or frustroconical, ogived (e.g., have an equilateral ogive cross section), or have any other suitable configuration. The interfaces can be arranged with the broad end proximal or abutting the component radially coupled to the shaft. The interface is preferably concentric with the processing shaft 113, but can alternatively be offset from the shaft or otherwise arranged relative to the processing shaft 113.

Figure 12:
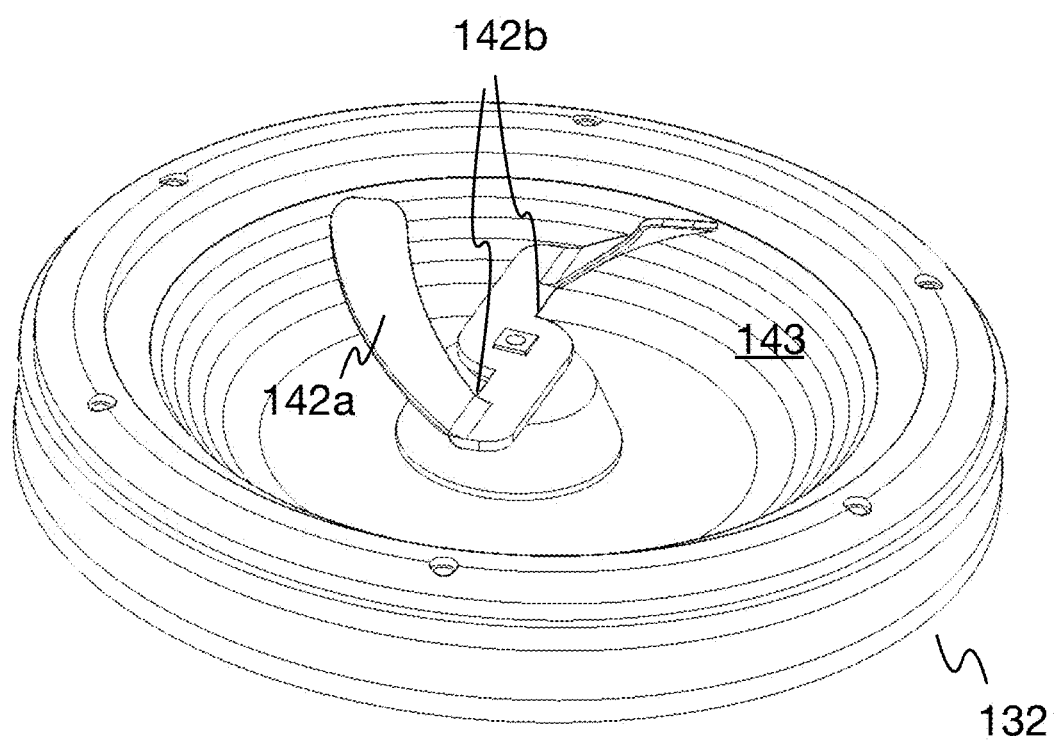
FIG. 12 is a perspective view of several internal components of a variation of the chamber, including the impact surface, the blades, and the set of interfaces between the blades and the shaft.

The impact surface 143 of the size reduction mechanism 140 functions to provide a substantially rigid surface against which the reducers 141 can impact the particulates (e.g., chocolate precursors, chocolate, etc.). The impact surface 143 can be substantially smooth, textured (e.g., include dimples, protrusions, grooves, etc.), or have any other suitable surface treatment. The impact surface 143 is preferably substantially flat, but can alternatively be curved, angled, or have any other suitable configuration. The impact surface 143 is preferably arranged within the chamber lumen 138, but can alternatively be arranged elsewhere in the system. FIG. 12 shows a variation including a curved, grooved impact surface 143 on the inner surface of the second end 132 of the chamber 130. The impact surface 143 can be a separate component, reducer component, or be defined by a chamber component. The impact surface 143 can be defined along the chamber 130 second end 132, the chamber wall, a feature extending from the chamber wall or second end 132, or be defined in any other suitable manner. The impact surface 143 can be made of the same material or material having similar material properties as the reducer 141, or can be made of different materials. The surface can be made of metal, ceramic, polymer, or any other suitable material.

Figure 20:
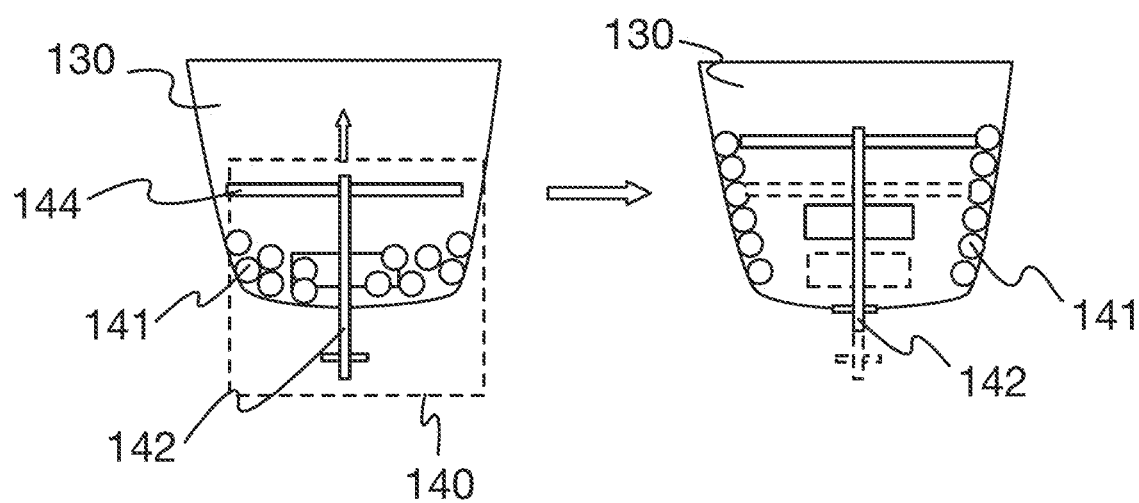
FIG. 20 is a schematic illustration of the operation of a variation of the system in two distinct operating modes, including the arrangement of the size reduction mechanism and the motion of the agitation mechanism between the two modes.
Figures 21A, 21B, 21C:
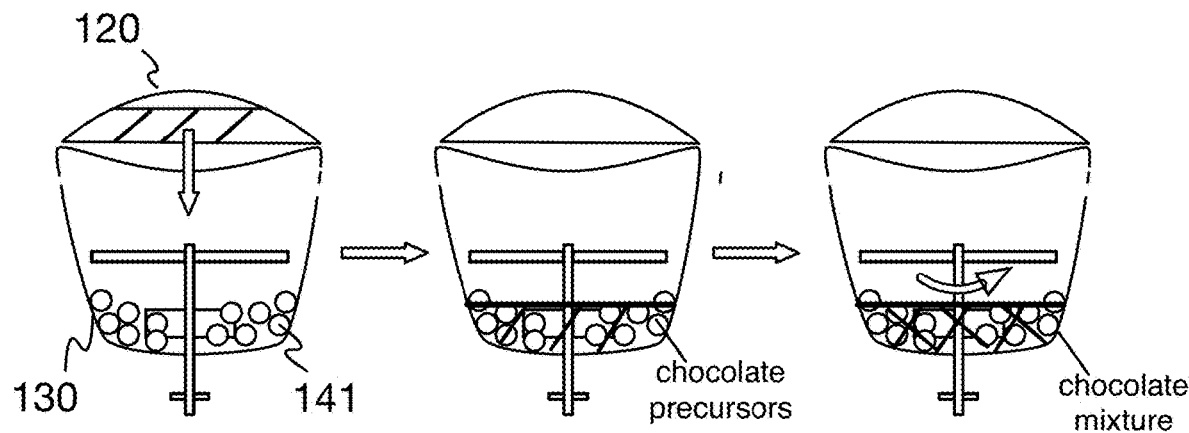
FIGS. 21A-F are schematic representations of a variation of the system during precursor ingress into the chamber, precursor loaded within the chamber, precursor grinding and reduction, conching, tempering, transitioning into the extraction mode, and chocolate mass extraction from the chamber, respectively.
Figures 21D, 21E, 21F:
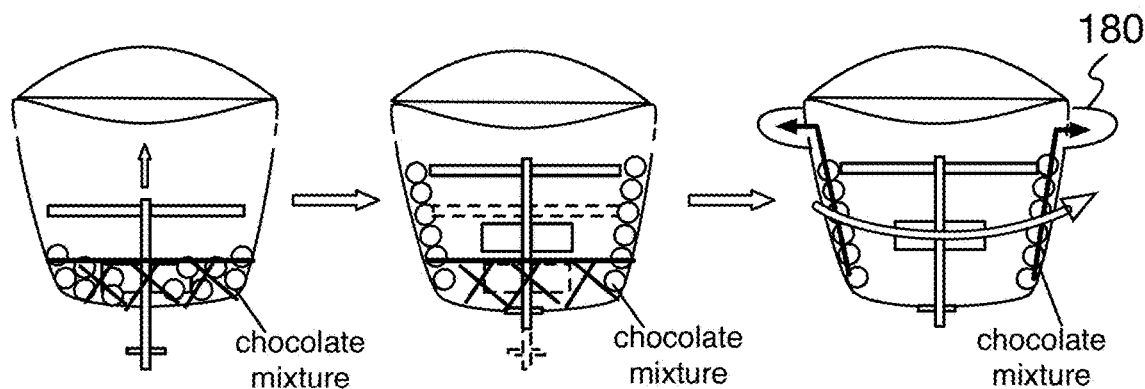

As shown in FIG. 20, the size reduction mechanism 140 can additionally include a wiper 144 that functions to prevent reducer 141 and/or material (e.g., chocolate mass) buildup along the chamber walls during one or more processing steps. The wiper 144 can extend radially from the shaft and be statically coupled to the shaft, but can alternatively extend in any other suitable direction, actuate relative to the shaft (e.g., rotate about the longitudinal axis, along the longitudinal axis, etc.), or actuate in any other suitable manner. The wiper 144 can additionally include an interface or transition element that gradually transitions between the wiper 144 and shaft at the wiper-shaft junction. The wiper 144 is preferably arranged distal the second end 132 across from the blades 142a, a predetermined distance away from the blades 142a (e.g., 10 ball diameters away from the blades 142a), but can alternatively be arranged in any other suitable position. The wiper 144 can be substantially flat, twisted, curved, or otherwise configured. The wiper 144 can be a plate (e.g., a polygonal plate, a circular plate, etc.), a blade, or have any other suitable form factor. The wiper 144 preferably extends from the shaft and terminates proximal the chamber wall (e.g., wherein the distance can be 0.2 ball diameters, smaller, or larger) in at least one operation mode (e.g., the grinding and refining operation modes), but can alternatively terminate at any other suitable distance. The wiper 144 can be made of metal, polymer (e.g., polyethylene), or any other suitable material. The wiper 144 can be made of or coated in a hydrophobic or oleophobic material, but can alternatively be made of or coated in a hydrophilic or oleophilic material.

The size reduction mechanism 140 can be operable between several operation modes, examples of which are shown in FIGS. 21A-F. In a first mode, the size reduction mechanism 140 grinds and heats the chocolate precursors (e.g., cacao nibs) to release and liquefy the cocoa butter and produce chocolate liquor (liquid chocolate). In this mode, the agitation mechanism 142 is rotated to drive the reducers 141 into the impact surface 143 and into each other. In a first variation, the agitation mechanism 142 drives the reducers 141 against an impact surface 143 arranged along the second end 132. In a second variation, the agitation mechanism 142 drives the reducers 141 against an impact surface 143 arranged along the chamber wall. However, the agitation mechanism 142 can be rotated in any other suitable manner. The agitation mechanism 142 is preferably rotated in a single rotational direction, but can alternatively rotate in a first direction then a second direction (e.g., to engage the wiper 144 with the material built up against the chamber wall), reciprocate between the first and second direction, or rotate in any other suitable manner. The agitation mechanism 142 can be rotated at 250 rpm, at a speed between 50 and 500 rpm, or at any other suitable speed. In this mode, the size reduction mechanism 140 is preferably rotatably coupled to (e.g., rotates relative to) the chamber 130, but can be otherwise coupled to the chamber 130. The size reduction mechanism 140 can be operated in the first mode for a predetermined period of time (e.g., based on the composition of the chocolate precursors, etc.), until a predetermined particulate size is achieved for a predetermined percentage of the mixture, or until any other suitable mixture parameter is achieved (e.g. target temperature, viscosity, mass, etc.).

In a second mode, the size reduction mechanism 140 reduces the particle size of the chocolate mass and other chocolate precursors, distributes cocoa butter evenly throughout the mass, and melts and distributes the cocoa butter throughout the mixture. In this mode, the size reduction mechanism 140 can be rotated in the same direction as the first mode or in a different direction. The size reduction mechanism 140 is preferably rotated at a speed slower than in the first mode (between 150 and 350 rpm), but can alternatively be rotated at the same speed as or faster than the first mode. In this mode, the size reduction mechanism 140 is preferably continually rotatably coupled to (e.g., rotates relative to) the chamber 130, but can be intermittently rotatably coupled to the chamber 130 and intermittently statically coupled to the chamber 130 (e.g., to promote denser material travel to the chamber lumen 138 perimeter, thereby increasing unrefined material contact with the reducers 141), continually statically coupled to the chamber 130, or otherwise coupled to the chamber 130. The size reduction mechanism 140 can be operated in the second mode for a predetermined period of time (e.g., based on the composition of the chocolate precursors, etc.), until a predetermined particulate size is achieved for a predetermined percentage of the mixture, until a predetermined viscosity is achieved (e.g., based on the torque on the motor, the amount of power or current required to keep the motor rotating at a predetermined rpm, or change in temperature resulting from reduced friction), or until any other suitable mixture parameter is achieved.

In a third mode, the size reduction mechanism 140 agitates the chocolate mass to create and/or distribute crystalline chocolate seeds throughout the viscous or liquid mass to temper the chocolate. In this mode, the size reduction mechanism 140 can be rotated in the same direction as the first mode, in an opposing direction, in a reciprocating pattern (e.g., back and forth), or in any other suitable direction. The size reduction mechanism 140 is preferably rotated at a speed slower than the first mode, between 50 and 200 rpm, but can alternatively be rotated at a speed faster or equal to the first mode. The size reduction mechanism 140 can be operated in the third mode for a predetermined period of time (e.g., based on the composition of the chocolate precursors, etc.), for a predetermined number of rotations, until a predetermined optical property (e.g., reflectance, color uniformity, etc.) is achieved, until a predetermined temperature is achieved, or until any other suitable mixture parameter is achieved. Alternatively, the chocolate can be tempered by nucleating seed sites (e.g., using the shear force of the reducers 141, locally holding the temperature of the mixture at a predetermined temperature, etc.), introducing crystalline seeds of the preferred crystalline form into the mixture, aerosolizing the mixture, or otherwise tempering the chocolate.

In a fourth mode, the size reduction mechanism 140 is coupled to the chamber 130 such that the drive mechanism 110 applies an extraction force on the chamber 130 contents. The extraction force can be a centrifugal force, gravity force, vacuum, or any other suitable extraction force. This mode can additionally be used to remove effluent during the cleaning process. In one variation, all or a portion of the size reduction mechanism 140 (e.g., the agitation mechanism 142) can be statically coupled to the chamber 130, such that shaft rotation by the drive mechanism 110 rotates the chamber 130 about a rotational axis (e.g., the longitudinal axis of the chamber 130). In this variation, the agitation mechanism 142 can be linearly actuated (e.g., along the rotational axis, perpendicular to the rotational axis, etc.), rotationally actuated, or otherwise actuated from a first position, in which the agitation mechanism 142 is rotatably coupled to the chamber 130, to a second position, in which the agitation mechanism 142 is statically coupled to the chamber 130 (e.g., to a chamber wall, first end 131, second end 132, etc.). Agitation mechanism 142 retention in the second position can additionally function to increase the radial clearance between the wall and the wiper 144, thereby permitting chocolate and reducer 141 travel beyond the wiper 144 plane and/or reducer 141 buildup against the wall. In one example, the shaft of the agitation mechanism 142 is retracted along the rotational axis to engage with the chamber 130 component supporting the shaft end. In some variants, this can function to increase the radial clearance between the blade 142a tip and the angled chamber wall, thereby permitting chocolate egress and reducer 141 buildup against the wall. In a second example, the shaft of the agitation mechanism 142 is extended into the chamber lumen 138 to engage with a chamber component proximal the blades 142a (e.g., to statically retain the blades 142a). However, the agitation mechanism 142 can be otherwise statically retained relative to the chamber 130. In a second variation, the size reduction mechanism 140 can be decoupled from the drive mechanism 110, wherein size reduction mechanism 140 decoupling from the drive mechanism 110 can automatically transfer the force generated by the drive mechanism 110 to the chamber 130, a pump, or any other suitable chocolate extraction mechanism. In a third variation, a material outlet 135 arranged along the second end 132 (e.g., lower end of the chamber 130 relative to a gravity vector) can be opened and the chamber 130 vibrated to change the viscous properties of the chocolate mass, such that the chocolate mass flows out the material outlet 135. However, the chocolate can be otherwise extracted. In the fourth mode, the extraction force can be applied for a predetermined period of time (e.g., based on the composition of the chocolate precursors, a retrieved recipe, etc., such as for 5 minutes), until a predetermined content property (e.g., mass change within the chamber 130, etc.) is achieved, until a predetermined physical property (e.g., motor torque, the amount of power or current required to keep the motor rotating at a predetermined rpm, etc.) is achieved, or until any other suitable mixture parameter is achieved.

In the extraction mode, the rotating chamber 130 promotes chocolate radial flow away from the axis of rotation, towards the extraction aperture 135. In some variations, the rotating chamber 130 can promote chocolate flow up the chamber walls (e.g., due to centrifugal force and the slope of the walls), to the material outlet 135, and out the material outlet 135 into a mold 180 or other chocolate retention mechanism. The rotating chamber 130 can additionally promote reducer array formation and/or movement along the chamber walls, wherein the chocolate can flow through the reducer array. Alternatively or additionally, the wiper 144, chamber interior wall configuration, or other system component can disrupt the reducer array. In one example, the interior chamber 130 diameter can increase with distance away from the second end 132 to the material outlet 135, and decrease with distance away from the material outlet 135 to the first end 131. In this example, the angled wall between the material outlet 135 and first end 131 can function to disrupt and/or prevent reducer array formation. The rotating chamber 130 can additionally or alternatively be linearly vibrated (e.g., along the longitudinal axis or in a radial direction) to promote chocolate egress with the drive mechanism 110 or a second vibration system. However, the chocolate mass can be otherwise extracted from the chamber lumen 138.

In this mode, the size reduction mechanism 140, more preferably the agitation mechanism 142, can be rotated in the same direction as the first mode, in an opposing direction, in a reciprocating pattern (e.g., back and forth), or in any other suitable direction. The agitation mechanism 142 is preferably rotated at a speed faster than the first mode, between 500 and 2800 rpm (e.g., 1100 rpm), but can alternatively be rotated at a speed slower or equal to the first mode. The size reduction mechanism 140 can be operated in the fourth mode for a predetermined period of time (e.g., based on the composition of the chocolate precursors, etc., such as for 5 minutes), until a predetermined content property (e.g., mass change within the chamber 130, etc.) is achieved, or until any other suitable mixture parameter is achieved.

1.6 Mold

The system 100 can additionally include one or more molding systems that function to retain the chocolate before, during, and/or after extraction and/or shape the chocolate during cooling and solidification. The mold 180 can be removable or be substantially permanently couple to the system, more preferably to the material outlet 135 but alternatively to any other suitable portion of the system. The mold 180 can be flexible, substantially rigid, or have any other suitable hardness. The mold 180 can additionally include an identifier that functions to identify the mold 180 (e.g., the batch, batch size, ingredients, mold-associated entity, etc.). The mold 180 can additionally or alternatively retain or be filled with additives (e.g., nuts, berries, etc.), aesthetic elements (e.g., gold leaf) or any other suitable inclusion. Mold 180 and/or mold 180 lumen parameters (e.g., temperature, pressure, hardness, size, etc.) can be substantially static, actively controlled, passively controlled, or otherwise controlled. The system 100 can accommodate one or more molds 180 of varying shape, size, material, manufacture, or accommodate any other suitable type of mold 180.

In a specific variation, the mold 180 is circumferentially arranged around the chamber 130 as shown in FIG. 6, and functions to receive material from the chamber 130, through the extraction aperture 135, during operation in the extraction mode. In this variant, the mold 180 rotates in conjunction with the chamber 130 during extraction, and can include one or more outgassing ports for the removal of bubbles present within the material after egress from the chamber 130. In other variants, the mold 180 can remain stationary relative to the chamber 130 during extraction and interface to the chamber 130 with a sliding seal, or any other suitable interface. However, the mold 180 can also be configured in any other suitable manner.

1.7 Temperature Control System

The system 100 can additionally include a temperature control system 170 that functions to control the temperature of all or a portion of the chamber lumen 138, chamber retention lumen, mold 180 temperature, or any other suitable portion of the system. The temperature control system 170 can be used to control the chocolate mass temperature during different processing steps. For example, the temperature control system 170 can maintain the temperature of the chocolate mass within a predetermined temperature range during the grinding and refining process, heat the chocolate mass during conching, cycle the temperature of the chocolate mass during the tempering process or control the chocolate mass temperature in any other suitable manner.

The temperature control system 170 can additionally or alternatively be used to control the chamber 130 temperature prior to the introduction of the chocolate precursors to evaporate excess water remaining from cleaning.

The temperature control system 170 can be an active system or passive system. The temperature control system 170 can include a temperature sensor 171 and one or more heat management systems. The temperature sensor 171 is preferably thermally coupled to the chamber interior, more preferably to the chocolate mass within the chamber interior but alternatively the chamber wall, mold 180, or any other suitable portion of the chamber interior or system. The heat management system can include: a set of air manifolds fluidly connecting a gaseous source of gas (e.g., the chamber 130 or system exterior, a gas tank, the drive mechanism exhaust, etc. for cooling and/or conching) at a first temperature (e.g., room temperature, a predetermined temperature, etc.) to the chamber 130 or chamber lumen 138 (e.g., over the chocolate mass, through the chocolate mass, etc.), an active cooling system, a heater, a temperature-controlled insert (e.g., dipstick, etc. for locally controlling temperature within the mixture, such as to seed the mixture), or any other suitable heat management system. The chamber lumen 138 can additionally or alternatively be thermally coupled to the drive mechanism 110, such that the contents are heated with waste heat from the drive mechanism 110. The heat management system 166 can be selectively coupled to the chamber lumen 138, continuously coupled to the chamber lumen 138, or otherwise coupled to the chamber lumen 138.

In a first variation, the heat management system includes a plate 172b that can be selectively heated and/or cooled. The plate 172b can be separated from the chamber 130 by a finite spacing while the plate 172b (e.g., a heat transfer surface) is reduced in temperature (e.g., cooled), in order to reduce the thermal mass of the cooled portion of the heat management system and facilitate rapid cooling. Alternatively, the heat management system can abut the chamber 130 while the portion of the heat management system is cooled, in order to directly cool the chamber 130. However, the heat management can be otherwise configured in any suitable manner.

In a specific variation, the temperature control system 170 includes a linear actuator 173 coupled to the chamber 130, and the plate 172b is part of an electrothermal heat pump 172a (e.g., a Peltier heat pump). The linear actuator 173 functions to retain the chamber 130 away from a heat transfer surface (e.g., the plate 172b) of the heat pump 172a during operation in some modes (e.g., the grinding mode, the refining mode) and against the plate during operation in other modes (e.g., the tempering mode). In a specific example, the linear actuator 173 retains the chamber 130 away from the plate 172b while the system 100 is operated in the refining mode, and the plate 172b is cooled to the proper temperature for tempering without thermally contacting the contents of the chamber 130. Once the chocolate precursors are sufficiently refined (e.g., based on sensed chocolate precursor parameters, based on time, etc.), the linear actuator 173 retains the chamber 130 against the plate 172b, and the cooled plate 172b thermally conducts heat away from the contents of the chamber 130 and thereby brings the contents to the proper temperature for tempering. However, the same mechanical sequence could be performed to heat the contents, e.g., when the plate 172b is heated while the chamber 130 is retained away from the plate 172b and conducts heat to the contents of the chamber 130 when the chamber 130 is retained against the plate 172b. Alternatively, the linear actuator 173 can retain the chamber 130 against and/or away from the plate in any mode of operation, for any suitable purpose.

The plate 172b preferably functions as a heat sink (e.g., cooling surface), but can additionally or alternatively function as a heat source (e.g., heating surface), to maintain a temperature set point (e.g., alternately heating and cooling based on the instantaneous temperature), or as any other suitable surface for heat transfer. In some variants, the electrothermal heat pump 172a can direct waste heat produced by cooling the heat transfer surface into the chamber lumen 138 or other components of the system 100 (e.g., the mold 180, the filter 151, the agitator, the reducers 141, etc.). The waste heat can be directed to the system 100 endpoint via direct mechanical thermal connection (e.g., a thermally conductive rod, pipe, linkage, etc.), via indirect thermal connection (e.g., convection, thermal radiation, etc.), or in any other suitable manner. In other variants, the electrothermal heat pump 172a can be configured to conduct, radiate, and/or convect heat in any suitable manner.

In a second variation, the heat management system includes a manifold 172c that routes waste heat from the rotary drive mechanism 110a to the chamber 130 by way of one or more thermal connections. The thermal connections of the manifold 172c can conduct heat (e.g., through thermally conductive solid structures), convect heat (e.g., by directing a gaseous medium between the drive mechanism 110 and the chamber 130), or transfer heat through a combination of conduction and convection or any other suitable manner. Heat is preferably directed to the contents of the chamber 130 by heating the chamber 130 itself (e.g., externally heating the chamber walls), but the manifold 172c can alternatively pass into the chamber 130 and guide heat directly to the contents (e.g., the thermal connections are tubes that vent heated air into the chamber 130). Heat can additionally or alternatively be transferred to and/or from the chamber 130 and contents of the chamber 130 in any other suitable manner.

In a third variation, the heat management system includes the drive mechanism 110, wherein the chamber 130 and/or mold 180 is cooled by air flowing past the chamber 130 and/or mold 180 as the respective component is being rotated within the frame 160. Air flow can be the result of the rotation, and/or additional air flow can be directed towards and/or within the chamber 130 and/or mold 180. However, the temperature control system 170 and heat management system can be otherwise configured.

In some variants of the system, the temperature control system 170 can include an inductive heating mechanism that functions to heat the contents (e.g., ingredients, materials, etc.) of the chamber 130. In particular, in variations including conductive metal balls 141a (e.g., as part of a ball mill), the inductive heating mechanism can heat the metal balls 141a as they are used to reduce and/or mix the ingredients within the chamber 130. Used in this way, the inductive heating mechanism can function to efficiently and rapidly distribute heat throughout the chamber 130 and/or the contents of the chamber 130 (e.g., ingredients, materials, precursors). Alternatively or additionally, the chamber walls can be inductively heated, in variations in which the chamber 130 is constructed of conductive material.

1.8 Balance Ring

Figure 3:
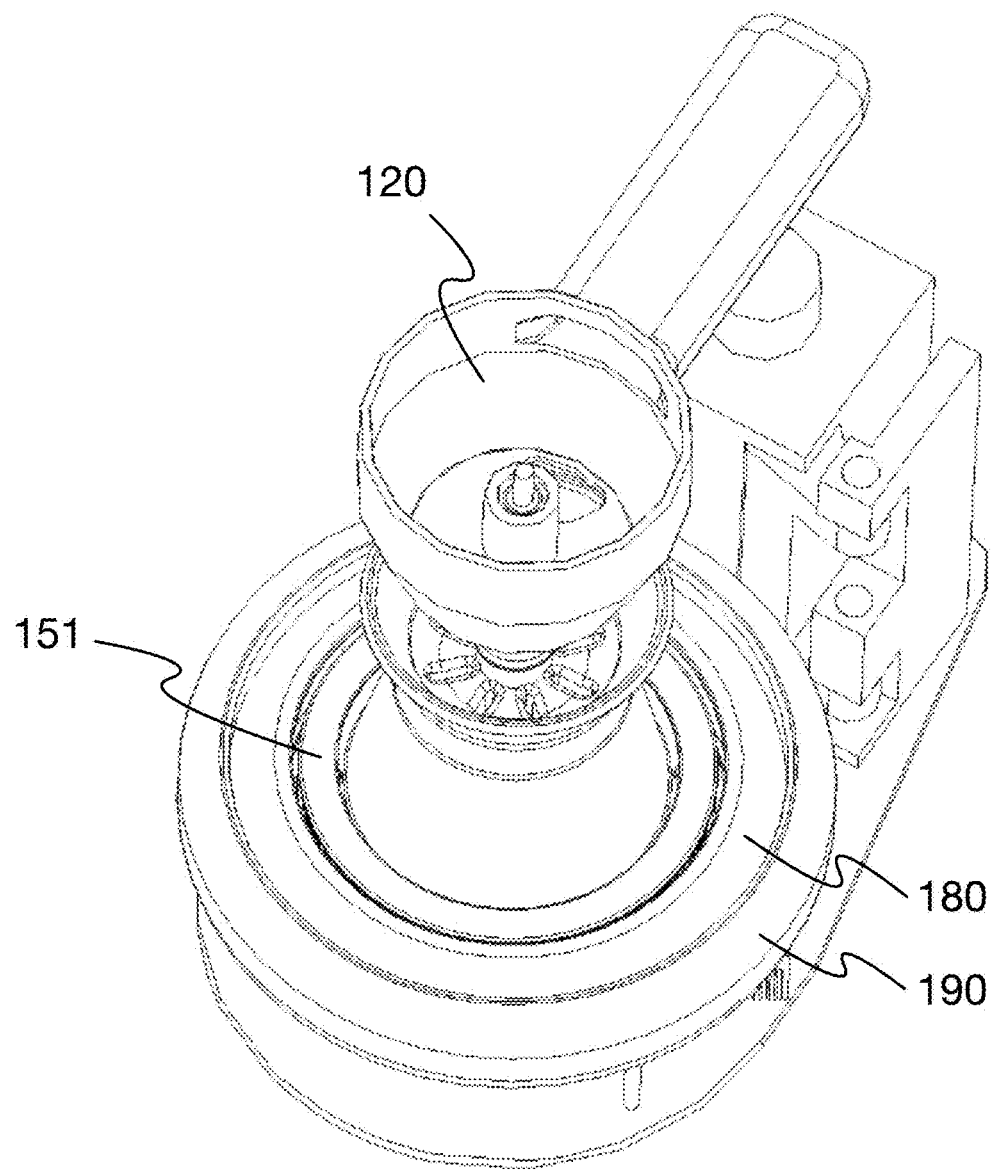
FIG. 3 is an overhead perspective view of a variation of the system including a balance ring, a mold, and a filter.

The system 100 can additionally include a balance ring 190 which functions to counteract unwanted motion of the system 100 induced by imbalances generated during operation of the system. Such motion can arise from the rotation of the chamber 130, reducer(s) 141, and/or related components, and/or from vibration, precession, shudder, nutation, or any other motion generated or induced by various system components. The balance ring 190 preferably includes a counterweight that translates along the ring in opposition to the motion of the center of mass of the system 100 (excluding the counterweight) during operation in the described modes. Alternatively, the balance ring 190 can include a fluid component that dynamically flows to counteract the rotation, a combination of a fluid component and a solid counterweight, or any other suitable counterbalancing mechanism or configuration. The balance ring 190 preferably extends entirely around the circumference of the chamber 130 and/or mold 180 in a continuous, closed, circular path as shown in FIG. 3, but can alternatively extend through a partial arc of a circle around the chamber 130 circumference, extend around a different circular path (e.g., a circular path that does not extend circumferentially around the chamber 130), extend discontinuously over multiple arcs, or be oriented in any other suitable configuration. The balance ring 190 preferably lies in a plane normal to the axis of rotation, but can alternatively or additionally intersect a plane normal to the axis of rotation, be arranged at an angle to the axis of rotation, parallel to the axis of rotation, or otherwise arranged relative to the chamber 130. However, the balance ring 190 can also be configured in any other suitable manner, or omitted entirely.

In a specific example, the balance ring 190 extends circumferentially (e.g., in a complete circle) around the chamber 130, and defines a lumen that likewise extends circumferentially around the chamber 130. A plurality of spherical weights (e.g., beads, Dynabeads, ball bearings, pellets, etc.) are placed in the lumen and are free to self-distribute in response to precession, nutation, or any other motion of the balance ring 190 induced by the system 100. The balance ring 190 is mechanically coupled to the system 100 (e.g., clamped to the frame) such that the counter-motion of the weights within the lumen of the balance ring 190 damp out unwanted motion (e.g., wobbling, rocking, swaying, vibrating, etc.) of the system 100 during operation.

The system can additionally include a bean processing subsystem, which functions to roast, winnow, and/or otherwise process the beans. The bean processing subsystem is preferably operated before the chocolate precursors are ground and/or refined, but can alternatively be operational during, after, or at any other suitable time. The bean processing subsystem can include a heating mechanism to roast the beans, an airflow mechanism configured to blow air over the beans to winnow the beans, a vibration mechanism to winnow the beans, or any other suitable component. In one specific example, the bean processing subsystem can include the chamber and temperature control system. In a second example, the bean processing subsystem can include a separate component external the chamber. However, the bean processing subsystem can be otherwise located.

2. Method

Figure 13:
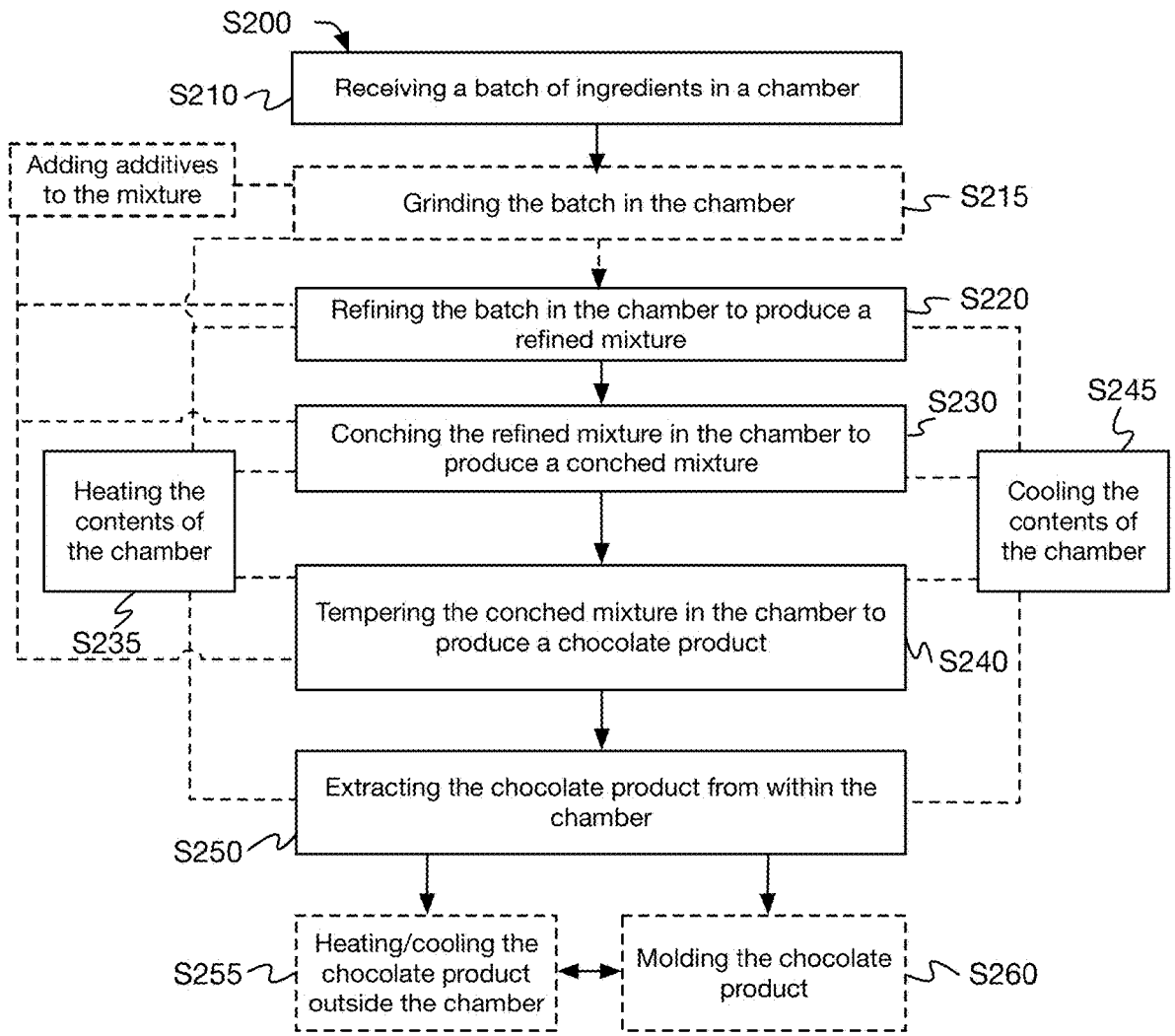
FIG. 13 is a flowchart representation of a variation of the method for chocolate processing.

As shown in FIG. 13, an embodiment of a method S200 for producing chocolate with a system includes: receiving a batch of ingredients within a chamber of the system S210; grinding the batch within the chamber to create a ground mixture S215; refining the ground mixture within the chamber to produce a refined mixture S220; conching the refined mixture within the chamber to produce a conched mixture S230; tempering the conched mixture within the chamber to produce a chocolate product S240; and extracting the chocolate product from within the chamber S250. The method S200 can additionally or alternatively include: heating the batch of ingredients, the refined mixture, the conched mixture, and/or the chocolate product within the chamber S235;

cooling the batch of ingredients, the refined mixture, the conched mixture, and/or the chocolate product within the chamber S245; heating and/or cooling the batch of ingredients, the refined mixture, the conched mixture, and/or the chocolate product outside the chamber (e.g., in a precursor dispenser, in a mold) S255; and molding the chocolate product S260. The system for chocolate production is preferably a system such as the system 100 described above, but can alternatively be any suitable system. In particular, the system for chocolate production is preferably configured for batch production, such that all the various processing steps are performed using the same set of components and substantially sequentially. For example, refining, conching, tempering, and extraction can be performed within the same chamber. Alternatively, the system can be configured for continuous production, and/or various steps can be performed simultaneously, at overlapping times, or in any other suitable manner. The method is preferably controlled by the processor (e.g., wherein the processor can be operatively connected, directly or indirectly, to each system component), but can alternatively be controlled by a set of connected passive mechanisms, by a user (e.g., manually) or by any other suitable control system.

The batch of ingredients preferably includes a plurality of chocolate particles. The batch of ingredients can additionally or alternatively include cocoa butter, vanilla, sugar, spices, milk, milk powder, fruit, nuts, or any other suitable additives.

Block S220, refining the batch of ingredients, functions to reduce the mean size of the chocolate particles. Refining the ingredients preferably includes intermittently striking a plurality of reducers of the system with an agitator of the system (e.g., ball milling). In a specific variation, refining the ingredients can include: mechanically connecting the agitation mechanism to the drive mechanism and controlling the drive mechanism (e.g., with the processor) to actuate the agitation mechanism (e.g., rotate the blades). In this variation, refining the ingredients can additionally include the rotationally decoupling the chamber from the drive mechanism. In a second specific variation, refining the ingredients can include: statically connecting the drive mechanism output to the chamber and controlling the drive mechanism (e.g., with the processor) to actuate the chamber (e.g., rotate the chamber). Alternatively, any other suitable technique for reducing particle size (e.g., disc milling, pounding, burr grinding, drum grinding, etc.) can be used. In further alternatives, refining the batch of ingredients can include reducing the heterogeneity of the distribution of various constituents of the ingredients (e.g., homogenizing the distribution; evenly distributing the chocolate particles within a quantity of cocoa butter). However, refining the batch of ingredients can also include any other suitable refining techniques.

Block S230, conching the refined mixture, functions to alter the physical and/or chemical consistency of the refined mixture to produce a conched mixture. The refined mixture is preferably conched after refinement, but can alternatively be conched during refinement or at any other suitable time. Conching the refined mixture preferably includes changing a thermodynamic state of the refined mixture, but can alternatively include agitating the refined mixture or otherwise altering the physical and/or chemical consistency of the refined mixture. Examples of changing a thermodynamic state of the refined mixture include: heating, cooling, compressing, and/or decompressing the refined mixture within the chamber. In a specific example, conching can include decreasing the pressure within the lumen and/or decreasing the temperature within the lumen. However, changing the thermodynamic state of refined mixture can include any suitable alteration of any state variable of the refined mixture. Examples of agitating the refined mixture include: mixing, stirring, whipping, spinning, shearing, and blending the refined mixture. However, agitating the refined mixture can include any suitable mechanical disturbance of the refined mixture. The chamber is preferably retained a predetermined distance away from the heat management system (e.g., the cold plate) during conching, but can alternatively be thermally coupled to the heat management system during conching. In a first specific example, the refined mixture is conched by waste heat generated by the reducers interacting with other system components. In a second specific example, the refined mixture is conched by waste heat conducted from the drive mechanism through the agitation mechanism. In a third specific example, the refined mixture is conched by heating the refined mixture with the heat management system or with heat from a secondary heat source. However, the refined mixture can be conched in any other suitable manner.

Conching the refined mixture can additionally include adding a liquid to the refined mixture. This can function to change the viscosity of the refined mixture, facilitate volatile removal or addition, flavor the mixture, or otherwise adjust the properties of the refined mixture. This can be particularly desirable when a drinking product (e.g., drinking chocolate) is desired as an end product, but can alternatively be used when a solid product is the end product (e.g., ganache, truffle, etc.). The liquid can be: water, alcohol, flavoring, extracts, milk, butter, or any other suitable liquid.

Block S240, tempering the conched mixture, preferably includes exchanging heat between the conched mixture and a temperature controller (temperature control system, heat management system) of the system, and can function to induce the formation of desired crystalline forms of cocoa butter in the produced chocolate. Tempering can additionally or alternatively include maintaining a predetermined temperature (or set of predetermined temperatures) of the conched mixture over a range of times, heating the conched mixture, cooling the conched mixture, and/or agitating the conched mixture. Tempering can additionally or alternatively include any suitable technique for inducing the proper physical and/or chemical structure within the chocolate product. The chamber is preferably retained adjacent to the heat management system (e.g., the cold plate) during tempering, but can alternatively be thermally decoupled from the heat management system during tempering. In a first specific example, the conched mixture is tempered by conducting away waste heat generated by the reducers interacting with other system components. In a second specific example, the conched mixture is tempered by convecting waste heat away from the chamber using directed air flow. In a third specific example, the conched mixture is tempered by cooling the conched mixture with the heat management system or by drawing away heat with a secondary heat sink. In a fourth specific example, tempering the mixture includes: heating the mixture to a first predetermined temperature at a predetermined rate, holding the mixture at the first predetermined temperature for a predetermined period of time, cooling the mixture to a second predetermined temperature at a predetermined rate, holding the mixture at the second predetermined temperature for a predetermined period of time, reheating the mixture to a third predetermined temperature, and holding the mixture at the third predetermined temperature while actuating the reducers and/or agitation mechanism. However, the conched mixture can be tempered in any other suitable manner.

Block S250, extracting the chocolate product from within the chamber functions to remove the chocolate product from the chamber after the necessary processing has occurred. Extraction is preferably performed radially, but can alternatively be from any suitable direction and along any suitable axis of the chamber. In particular, radially extracting the chocolate product preferably includes rotating the chamber to apply a centrifugal force to the chocolate product and the reduction spheres and forcing the chocolate product toward and through an extraction aperture of the chamber with the centrifugal force. Alternatively, extracting the chocolate product can be driven by gravity, a pump (e.g., a peristaltic pump, a vacuum pump, a hydraulic pump, etc.), or any other suitable technique with any other suitable mechanism. After extraction, the extracted chocolate can be cooled by the temperature management system (temperature control system), by rotating the molding system (e.g., cooling by convection), or cooling the extracted chocolate in any other suitable manner.

Figure 14:
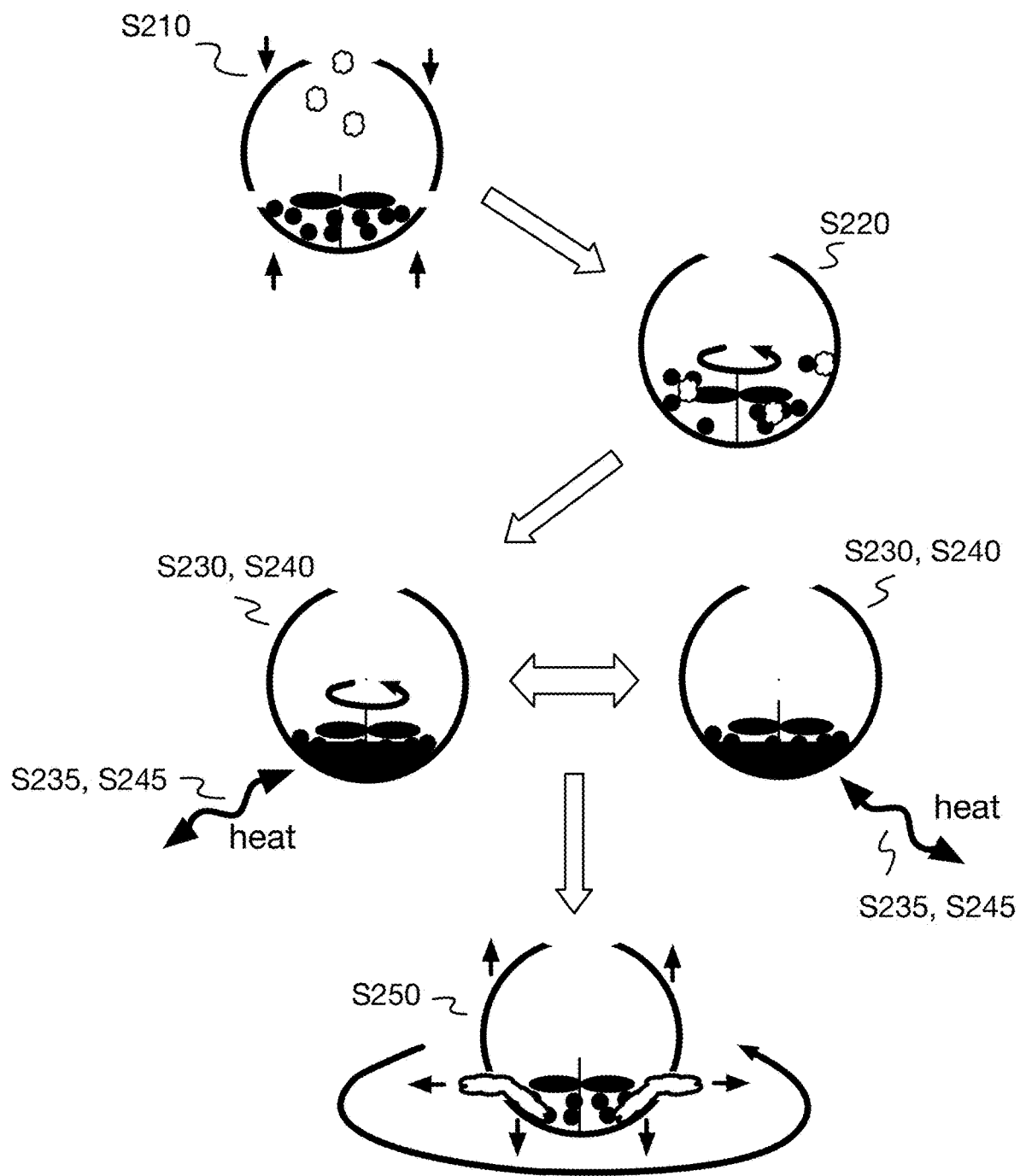
FIG. 14 is a schematic representation of a variant of the method.

In a first specific example of the method S200 depicted in FIG. 14, the first and second portions of the chamber are separated at a seam and initially biased apart by a spring. While receiving the batch of ingredients in the chamber, the ingredient dispenser is coupled to the chamber. Coupling the ingredient dispenser to the chamber applies a downward force on the first and second portion of the chamber, and thereby couples the first and second portions of the chamber together and seals the chamber lumen at the seam. The downward force also locks the processing shaft to the drive shaft, decouples the chamber from the drive shaft and statically couples the chamber to the frame. A linear actuator thermally decouples the chamber from a cooling plate by separating the chamber from the cooling plate by a finite separation distance. Refining the batch of ingredients includes rotating the processing shaft and the blades with the rotary drive mechanism, and thereby agitating the plurality of reducers within the chamber. The grinding and refining action of the reducers against the batch of ingredients, the interior walls of the chamber, and the other reducing elements acts to reduce the size of the individual particles within the batch of ingredients, as well as to distribute the constituents of the ground and refined ingredients throughout the mixture. Conching the mixture includes rotating the processing shaft and blade with the rotary drive mechanism, as well as heating the mixture with waste heat from the rotary drive mechanism and/or an external heat source. Tempering the mixture includes cooling the chamber lumen by retaining the chamber against the cooling plate using the linear actuator, and can also include rotating the processing shaft and blade with the rotary drive mechanism. Once the mixture has been sufficiently tempered, extraction of the mixture is performed by decoupling the chamber from the cooling plate via the linear actuator, removing the static coupling of the chamber to the frame, decoupling the processing shaft from the motor, coupling the processing shaft to the chamber, statically coupling the motor to the chamber, and rotating the chamber to extract the contents from the chamber lumen via a centrifugal force.

In a second specific example of the method S200, the material outlet of the chamber is closed during receiving of the batch of ingredients from the ingredient dispenser. Refining the batch of ingredients includes locking the processing shaft to the drive shaft of an electric motor and locking the chamber to the frame, then rotating the processing shaft and the blades connected to the processing shaft in order to agitate the plurality of reduction spheres. Refining also includes pulverizing the batch of ingredients between the plurality of reduction spheres and the interior walls of the chamber as a result of rotating the processing shaft and blades against the plurality of reduction spheres, as well as distributing the constituents of the pulverized batch of ingredients throughout the resultant refined mixture. Conching the refined mixture includes rotating the processing shaft and blades continuously through the refined mixture, and can also include agitation of the reduction spheres with the rotating blades, in order to produce a conched mixture. In this example, conching can also include directing waste heat from the electric motor to the chamber (e.g., through the shaft and blades, via a ducted manifold, etc.) in order to convectively and/or conductively heat the refined and/or conched mixture. Tempering the conched mixture includes cooling the walls of the chamber with an electrothermal heat pump (e.g., by thermally connecting the cold plate to the chamber), and can also include rotating the chamber relative to the frame and/or the processing shaft relative to the chamber to distribute the contents (e.g., the mixture, the reduction spheres) within the chamber. Extracting the tempered mixture includes opening the material outlet (e.g., by unlatching the ingredient dispenser or first end, etc.), and rotating the chamber relative to the frame with the electric motor to apply a radial force (centrifugal force) to the chocolate within the chamber lumen. This can additionally radially arrange the reduction spheres along the interior surface of the chamber. Extracting also includes forcing the tempered mixture outward from the axis of rotation of the chamber due to the rotationally generated centrifugal force, such that the tempered mixture passes through, over, and around the arranged reduction spheres in order to provide filtering of the mixture. Extracting also includes forcing the tempered mixture through the material outlet with the centrifugal force, and directly into a mold arranged circumferentially around the chamber for subsequent cooling and packaging.

Although omitted for conciseness, the preferred embodiments include every combination, permutation, and omission of the various system components and the various method processes.

The FIGURES illustrate the architecture, functionality and operation of possible implementations of systems, methods and computer program products according to preferred embodiments, example configurations, and variations thereof. In this regard, each block in the flowchart or block diagrams can represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

The invention claimed is:

1. A food processing system comprising:
   a chamber, defining a chamber lumen and a rotation axis, the chamber having an inlet and a radial extraction aperture, the chamber configured to receive food within the chamber lumen, the chamber rotatable about the rotation axis;
   a shaft oriented within the chamber lumen along the rotation axis, the shaft rotatable about the rotation axis; and
   a rotary drive mechanism selectively couplable to the shaft with a first drive component and to the chamber with a second drive component, allowing the rotary drive mechanism to rotate the shaft via the first drive component when configured to operate in a first mode and to rotate the chamber and the shaft via the second drive component when configured to operate in a second mode.

2. The system of claim 1, further comprising a motor coupled to the shaft, the shaft coupled to the chamber and configured to rotate the chamber at a designated angular velocity sufficient to move the food within the chamber lumen out the radial extraction aperture.

3. The system of claim 2, wherein the motor is configured to:
   estimate a viscosity of the food in the chamber lumen based on a motor torque, and
   set an optimal angular velocity of the chamber based on the viscosity sufficient to move the food out the radial extraction aperture.

4. The system of claim 1, further comprising a static or rotating mold defining a mold lumen, the static or rotating mold circumferentially arranged about the chamber, a portion of the mold lumen intersecting the radial extraction aperture in order to capture the food emerging from the chamber.

5. The system of claim 1, further comprising a rotating mold selectively coupled to the chamber and configured to receive a centrifugal force to rotate the food entering the rotating mold.

6. The system of claim 1, further comprising a screen through which the food moving through the radial extraction aperture or a mold is filtered based on a size of a hole in the screen.

7. The system of claim 4, wherein the static or rotating mold can be separated into parts at a seam in order to remove molded material from the mold lumen.

8. The system of claim 4, wherein the static or rotating mold or a mold insert is configured to take multiple forms to allow for molding of the food into a ring, a sphere, an ovoid or another selected form.

9. The system of claim 4, wherein the mold lumen is filled with inclusions or additives.

10. The system of claim 4, wherein the static or rotating mold is decorated with an aesthetic element.

11. The system of claim 7, further comprising a seal that restricts the food from leaking through the seam when a centrifugal force is applied to the food within the mold lumen.

12. The system of claim 5, wherein the centrifugal force is sufficient for causing removal of an air bubble from within the food in the rotating mold.

13. The system of claim 1, further comprising a rotating mold causing convective cooling of the food in the rotating mold.

14. The system of claim 1, wherein the rotary drive mechanism rotating the shaft is coupled to an agitation mechanism to cause a shear force on chocolate within the chamber lumen while also uniformly manipulating a temperature of the chocolate by means of a temperature control system, resulting in tempering of the chocolate.

15. The system of claim 14, wherein the shaft is rotated at different angular velocities or for different periods of time or at different temperatures to control seed crystal formation required for the tempering of the chocolate.

16. The system of claim 14, wherein the tempering of the chocolate is determined based on a change in viscosity of the chocolate which can be calculated from a motor torque.

17. The system of claim 14, further comprising a reducer manipulated by the agitation mechanism to cause a shear force on the chocolate.

18. The system of claim 17, wherein the reducer is a ball, a spheroid, a cylinder, a polygon, an ellipsoid, an eclipsoid, a sphere with opposing flat ends, an obliod, or any other form factor configured for generating a shear force.

19. The system of claim 17, wherein the reducer is thermally conductive.

20. The system of claim 1, further comprising a size reduction system, arranged within the chamber lumen.

21. The system of claim 1, further comprising a tempering system having a thermal transfer surface thermally connectable to the chamber.

22. The system of claim 1, wherein the radial extraction aperture is configured to be selectively opened and closed.

23. The system of claim 14, further comprising a processor executing instructions stored in non-transitory media, the instructions for the manipulating of the temperature of the chocolate by the temperature control system or by speed of the agitation mechanism.

* * * * *